(12) United States Patent
Mutlu et al.

(10) Patent No.: US 10,871,820 B2
(45) Date of Patent: Dec. 22, 2020

(54) SELF-MIXING BASED 2D/3D USER INPUT DETECTION AND SCANNING LASER SYSTEM

(71) Applicant: Apple Inc., Cupertino, CA (US)

(72) Inventors: Mehmet Mutlu, Stanford, CA (US); Ahmet Fatih Cihan, Stanford, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/408,295

(22) Filed: May 9, 2019

(65) Prior Publication Data

US 2020/0356159 A1    Nov. 12, 2020

(51) Int. Cl.
| | | |
|---|---|---|
| *G06F 3/042* | (2006.01) | |
| *G06F 3/01* | (2006.01) | |
| *G01B 11/14* | (2006.01) | |
| *G01B 11/16* | (2006.01) | |
| *H04N 9/31* | (2006.01) | |

(52) U.S. Cl.
CPC .............. *G06F 3/011* (2013.01); *G01B 11/14* (2013.01); *G01B 11/161* (2013.01); *G06F 3/017* (2013.01); *G06F 3/0421* (2013.01); *G06F 2203/04108* (2013.01); *H04N 9/3129* (2013.01); *H04N 9/3185* (2013.01)

(58) Field of Classification Search
CPC ................................ G02B 6/42; G06F 3/0421
USPC ........................................ 345/173, 174, 175
See application file for complete search history.

(56) References Cited

U.S. PATENT DOCUMENTS

| | | | |
|---|---|---|---|
| 4,254,333 | A | 3/1981 | Bergström |
| 4,468,131 | A | 8/1984 | Bui et al. |
| 6,233,045 | B1 | 5/2001 | Suni et al. |
| 6,816,523 | B1 | 11/2004 | Glenn et al. |
| 6,872,931 | B2 | 3/2005 | Liess et al. |
| 7,509,050 | B2 | 3/2009 | Ekkizogloy et al. |
| 7,620,332 | B2 | 11/2009 | Nishiyama |
| 7,995,193 | B2 | 8/2011 | Kuwata |
| 8,208,814 | B2 | 6/2012 | Sheth et al. |

(Continued)

FOREIGN PATENT DOCUMENTS

| | | |
|---|---|---|
| CN | 102109650 | 6/2011 |
| CN | 108225543 | 6/2018 |

(Continued)

OTHER PUBLICATIONS

U.S. Appl. No. 16/917,891, filed Jun. 30, 2020, Chen et al.

*Primary Examiner* — Calvin C Ma
(74) *Attorney, Agent, or Firm* — Brownstein Hyatt Farber Schreck, LLP

(57) ABSTRACT

Disclosed herein are electronic devices, and methods for their operation, that identify user inputs based on interaction of an object with input surfaces separate from the electronic devices. The electronic devices may include one or more self-mixing interferometry sensors that scan a field of view containing the input surface with a light beam, such as a laser beam emitted laser diode. Self-mixing of the emitted light with reflections can generate a self-mixing interferometry signal. Analysis of the self-mixing interferometry signal can allow for identification of an object, such as a user's finger, in the field of view. Deformation of the finger can be detected with the self-mixing interferometry sensor, and a user input identified therefrom.

20 Claims, 21 Drawing Sheets

(56) References Cited

U.S. PATENT DOCUMENTS

| | | | |
|---|---|---|---|
| 8,401,816 B2* | 3/2013 | Thierman | G01C 15/002 |
| | | | 702/151 |
| 8,529,460 B2* | 9/2013 | Kawano | A61B 5/0261 |
| | | | 356/27 |
| 8,896,745 B2 | 11/2014 | Takachi | |
| 8,942,069 B2 | 1/2015 | Tortora | |
| 9,091,573 B2 | 7/2015 | Van Der Lee et al. | |
| 9,625,389 B2* | 4/2017 | Shiozawa | G01N 21/65 |
| 9,912,923 B2 | 3/2018 | Kilcher et al. | |
| 2005/0156874 A1* | 7/2005 | Kong | G06F 3/0421 |
| | | | 345/156 |
| 2008/0061220 A1* | 3/2008 | Machida | G06F 3/0317 |
| | | | 250/221 |
| 2009/0002829 A1 | 1/2009 | Shinohara | |
| 2010/0302210 A1* | 12/2010 | Han | G06F 3/0412 |
| | | | 345/175 |
| 2011/0126617 A1 | 6/2011 | Bengoechea Apezteguia et al. | |
| 2012/0120375 A1* | 5/2012 | Kilcher | H04N 9/3194 |
| | | | 353/98 |
| 2017/0090599 A1 | 3/2017 | Kuboyama et al. | |
| 2017/0192133 A1 | 7/2017 | Murakami et al. | |
| 2017/0351049 A1 | 12/2017 | Yong et al. | |
| 2018/0080758 A1 | 3/2018 | Chen et al. | |
| 2018/0081434 A1 | 3/2018 | Siddiqui et al. | |
| 2018/0132043 A1 | 5/2018 | Bakish | |
| 2018/0224368 A1* | 8/2018 | Spruit | G01S 7/4817 |
| 2019/0090068 A1* | 3/2019 | Fishman | H01S 5/187 |
| 2019/0317454 A1 | 10/2019 | Holenarsipur et al. | |
| 2019/0391539 A1 | 12/2019 | Perkins et al. | |
| 2020/0200522 A1 | 6/2020 | Huang et al. | |

FOREIGN PATENT DOCUMENTS

| | | |
|---|---|---|
| WO | WO 05/013517 | 2/2005 |
| WO | WO 09/156937 | 12/2009 |
| WO | WO 17/178711 | 10/2017 |
| WO | WO 18/036685 | 3/2018 |
| WO | WO 19/042953 | 3/2019 |

* cited by examiner

SELF-MIXING BASED 2D/3D USER INPUT DETECTION AND SCANNING LASER SYSTEM

FIELD

The present disclosure generally relates to electronic devices and methods of their operation by which a user input to the electronic device can be detected by measurements of displacements or distances. The measured distances or displacements may be from a source of a light beam to either an input surface or an object in a field of view of the electronic device. The distances may be determined, in part, by using a self-mixing interferometry sensor that generates a self-mixing interferometry signal related to a reflection or backscattering of the light beam from the input surface or object.

BACKGROUND

Electronic devices, such as cell phones, desktop or tablet computers, personal digital assistants, and the like, often make use of user input devices by which users enter commands or data to the electronic devices. Examples of such input devices include buttons, keyboards, touch screens, and the like.

Such input devices often involve the user making physical contact with the input device, such as with a finger, stylus, or other user input object. Such input devices are often integrated components of the electronic devices, and so add weight, size, and power consumption to the electronic devices.

Further, such input devices typically only allow for detecting a press, or motion of a touch, in two dimensions on the device. They typically do not allow for detecting distance or gestures of the finger, stylus, or other input object toward or away from the device.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Disclosed herein are electronic devices, systems, and methods for detecting user input on an input surface. The electronic devices may project an image onto an input surface, which input surface may be either on or separate from the electronic device. The electronic devices may detect a user input on the input surface by scanning the input surface with a light beam emitted from a light source of a self-mixing interferometry sensor. Reflections of the light beam from an object or the input surface may be received into the self-mixing interferometry sensor and induce self-mixing interference in a source of the light beam. The source of the light beam may be a laser diode, such as a vertical cavity, surface emitting laser (VCSEL) diode, or another type. The self-mixing interference may induce a self-mixing interferometry signal in the self-mixing interferometry sensor that may be used to obtain one or more values of at least one of distance, displacement, velocity, or motion. The values may be used to infer presence and/or deformation of a user input object, such as a finger or stylus, between the input surface and the self-mixing interferometry sensor. A user input may then be inferred.

More specifically, described herein are methods of operating an electronic device. One method includes: scanning a field of view with a beam of light emitted by a self-mixing interferometry sensor; identifying, from a self-mixing interferometry signal generated by the self-mixing interferometry sensor, an input surface in the field of view, an object in the field of view, and a deformation of the object due to an interaction of the object with the input surface; and identifying a user input from the interaction of the object with the input surface.

In related embodiments, the methods may include mapping the location of the interaction to a portion of an image projected onto the input surface and altering an operation of the electronic device based on the user input. The beam of light may be produced by a laser diode. The methods may include identifying the input surface and the object based at least on: a first set of distances from the input surface to the laser diode determined using at least the self-mixing interferometry signal; and a second set of distances from the object to the laser diode determined using at least the self-mixing interferometry. The methods may include determining a location of the object, a motion of the object, a gesture of the object toward or away from the input surface, determining that the object is a user's finger, and determining that the deformation of the finger is caused by the finger applying a force against the input surface.

The methods may include determining an orientation and a topography of the input surface, and determining a correspondence between points of the image projected onto the input surface and the topography of the input surface.

Also described are electronic devices that include: at least one self-mixing interferometry sensor operable to scan all or a section of the field of view with a beam of light; and a processor operably linked with the image projector and the self-mixing interferometry sensor. The processor may be operable to: determine first distances from the self-mixing interferometry sensor to first locations on the input surface using a self-mixing interferometry signal generated by the self-mixing interferometry sensor; determine second distances from the self-mixing interferometry sensor to second locations on an object in the of the field of view using the self-mixing interferometry signal generated by the self-mixing interferometry sensor; identify a deformation of the object due to an interaction of the object with the input surface using at least the first distances and the second distances; and identify a user input to the electronic device from the interaction of the object with the input surface.

The electronic devices may also include an image projector operable to project an image onto the input surface. The processor may also be operable to determine a position of the interaction of the object with the input surface and map the position of the interaction to a portion of the image projected onto the input surface by the image projector. The position of the interaction of the object with the input surface may identify the user input to the electronic device. The user input may alter an operation of the electronic device. Examples of such alteration include changing the projected image, executing an action of the electronic device associated with the portion of the image projected onto the input surface, and providing feedback to the user of the electronic device.

Such electronic devices may use at least one laser diode as the source of the beam of light. Such electronic devices may determine the first and second distances from the self-mixing interferometry signal by applying a modulation to a bias current of the laser diode and analyzing an interferometric property affected by the modulation. The modulation may be a triangle wave modulation, and the analysis may be applying a spectrum analysis of a self-mixing interferometry signal of the interferometric property. The modulation may be a sinusoidal wave modulation, and the analysis may be applying a time domain analysis of a self-mixing interferometry signal of interferometric property.

The present disclosure also describes a method of operating an electronic device. The method includes: performing a first set of scans of a field of view with a beam of light emitted from a self-mixing interferometry sensor of the electronic device; determining, from a self-mixing interferometry signal generated by the self-mixing interferometry sensor during the first set of scans, a topography of an input surface within the field of view; projecting an image from an image projector of the electronic device onto the input surface; performing a second set of scans of the field of view; detecting, using the self-mixing interferometry signal measured by the self-mixing interferometry sensor during the second set of scans, a first object in the field of view and a three-dimensional position of the first object in the field; and determining a first user input to the electronic device based on the three-dimensional position of the first object in the field of view. In related embodiments, the method may include determining a three-dimensional motion of the first object in the field of view, and determining a user input to the electronic device based on the three-dimensional motion of the first object in the field of view. In other related embodiments, the method may include detecting a second object in the field of view and determining a three-dimensional motion of the second object, and determining a user input to the electronic device based on the three-dimensional motions of the first and second objects.

BRIEF DESCRIPTION OF THE DRAWINGS

The disclosure will be readily understood by the following detailed description in conjunction with the accompanying drawings, wherein like reference numerals designate like structural elements.

Figure 1A:
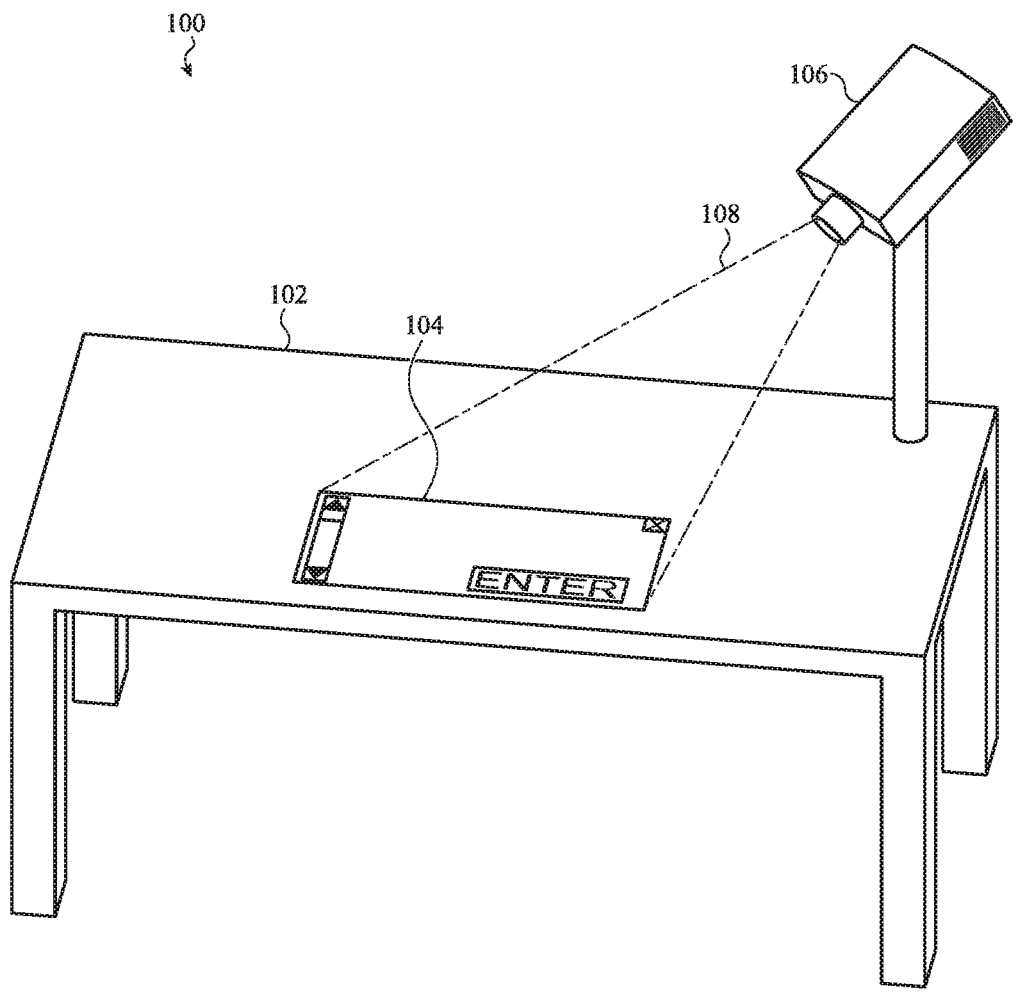
FIG. 1A illustrates an electronic device for projecting an image onto an input surface and receiving user input by user interaction with the input surface, according to an embodiment.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments described herein are directed to devices, systems, and methods for detecting a user input to an electronic device in which the user input is by a touch or a press force applied by a user input object (such as a finger or stylus) against an input surface, a motion of the user input object across the input surface, or a gesture by the user input object toward or away from the input surface. The input surface may be separate from the electronic device itself. One such system is a computer system which projects an image of a keyboard or other input screen onto a desktop. A user may then press on a location of the projected image to cause an input to the computer system associated with the part of the image associated with that location. As an example, a user may press against a projected "Enter" key to cause the computer system to execute an action.

Such devices, systems, and methods may have as advantages a reduction of associated hardware components, the ability to project the image against a variety of surfaces, and the ability to scale the projected image, among other advantages.

The electronic device may use scanning of a field of view that includes the input surface as part of both detecting the input surface's position or location in the field of view and detecting a user input on the image projected onto the input surface. The scanning may be performed using one or more light beams projected from the electronic device together with distance or displacement determinations based on reflections or backscatter of the projected light beam(s) detected by the electronic device. The light beam may include laser light emitted from one or more laser diodes. The distance or displacement determinations may be based on alterations of an interferometric parameter (such as a current or a voltage) caused by self-mixing interference between the emitted light beam(s) and the received reflections. The interferometric parameter may be an electrical parameter of a laser diode, or of a photodetector, or of another component of the self-mixing interferometry sensor. The electronic device may, in some embodiments, have separate subsystems for scanning the field of view and for projecting the image onto the input surface, whereas in other embodiments the scanning and the image projection may be in a unified subsystem.

As an example, a laser diode emitting laser light may undergo self-mixing interference with reflections of the emitted light so that the resulting wavelength and emitted optical power of the emitted light is altered from the wavelength and optical power that the emitted light would have in the absence of reflections causing the self-mixing interference. As examples, this alteration may cause a detectable change in a junction voltage of the laser diode or a detectable change in an output current of a photodetector associated with the laser diode. The detected change may then be correlated with a distance between the laser diode and the object reflecting the emitted laser light.

The devices, systems, and methods may be operable to detect a user input against a projected image by detecting an object in the field of view between the input surface and the light source of the scanning light beam. The object may be detected based on its distance from the light source. The object may be, for example, a finger of the user or a stylus employed by the user.

Distance or displacement determinations based on self-mixing interference may have a fine resolution, such as on the order of millimeters and even micrometers. Resolution of distances at a fine scale may allow for distinguishing between a finger lightly touching the input surface and the finger firmly pressing against the input surface. A finger applying a force against the input surface, such as by a firm press, may undergo more deformation from its resting shape than a finger applying a touch, so that there is a detectable change in distances from the light source of the scanning system to positions on the surface of the finger. The electronic devices may use calibration systems or procedures in which a user's finger is scanned, either with or without pressing against the input surface. This can provide one or more baseline shapes (or "topographies") of the finger so that presses by the finger against the input surface can be detected by deformations of that baseline topography.

Further, fine resolution of distances coupled with sufficiently rapid scanning may allow for detection of a motion of a user's finger or stylus across the input surface or a gesture of the user's finger or stylus in the space above the input surface. Such motion or gesture detection may indicate a particular type of user input, such as a scrolling operation or a rescaling of the projected image, among other user inputs.

The fine resolution of distances or displacements may also allow for detection of a position or motion of the user's finger (or fingers, or stylus) not just across the two-dimensional (2D) directions of the input surface, but also as a gesture in the third direction between the input surface and the electronic device. Such three-dimensional (3D) detection of position, motion, or gesture may allow for a greater range of user inputs. For example, ending of a press operation may be determined by a motion of the finger off the input surface. As another example, a movement of the user's finger toward or away from the input surface may indicate a zoom in or zoom out input to the electronic device.

Determination of distances to the input surface itself may allow the electronic device to adjust the displayed or projected image to preempt potential distortions. For example, if the distances to a flat input surface indicate that the input surface is positioned at an angle with respect to the image projecting system within the electronic device, the electronic device (such as by a processor therein) may be able to calculate how to adjust the projection of the image so that no parallax is seen in the projected image. In another example, the electronic device may be able to determine that the topography of the input surface itself is curved, such as a back side of a car seat, and adjust the projected image to correct for distortions that otherwise would occur. Or the electronic device may project the image in a fixed way but adapt how user interactions with the input surface are interpreted as user inputs.

Determination of distances or displacements may be made by a self-mixing interferometry sensor that may use a laser diode. In some embodiments, the bias current of the laser diode has an applied modulation about a constant level. In one family of such embodiments, the applied modulation is a triangle wave modulation. Corresponding variations in an interferometric property (such as a junction voltage or power, or a photodetector current) may be detected using a spectrum analysis. The results of the spectrum analysis can be used to determine absolute distances from the self-mixing interferometry sensor to the input surface or intervening object (such as a user's finger or stylus).

In a second family of such embodiments, the applied modulation to a bias current of a laser diode is a sine wave modulation. In this family of embodiments, a signal of an interferometric property, such as an output current of a photodetector, undergoes mixing and demodulation to separate components of the signal at a first frequency and at a second frequency. The distances or displacements may then be determined based on the phase of the two components.

These and other embodiments are discussed below with reference to FIGS. 1A-11. However, those skilled in the art will readily appreciate that the detailed description given herein with respect to these Figures is for explanatory purposes only and should not be construed as limiting.

FIG. 1A illustrates a configuration 100 in which an electronic device 106 projects an image 104 on an input surface 102. The electronic device 106 may be part of, or communicatively linked (either wired or wirelessly) with, another electronic device, such as laptop, tablet, or desktop computer, a smart phone, a gaming system, or another device. In the shown configuration 100, the input surface 102 is a user's desktop. The projected image 104 can function as an input device for the electronic device 106. A user can touch or press on the input surface 102 at a location at which the projected image shows an input element. For example, the projected image 104 shows an ENTER button in its lower right corner: if a user's finger (or stylus) is detected touching or pressing the projected ENTER button, the electronic device 106 may detect that touch or press, and execute a corresponding action. Also shown on the left in the projected image 104 are two scroll buttons. If the electronic device 106 detects a user pressing or touching the scroll button, the electronic device 106 can alter an operation. For example, the electronic device 106 may perform an action, such as altering the projected image 104, scrolling a displayed file, saving a file, executing a program, or providing feedback to the user.

The projected image 104 can be used as either a sole, primary, or secondary user input mechanism for the electronic device 106. For example, the projected image 104 may have a first section that shows and functions as a standard keyboard and a second section showing output images of, for example, a file being edited. In this way the electronic device 106 need not include a keyboard or touch pad itself, and in some cases may not include a display screen.

In some embodiments, the light 108 projected from the electronic device 106 may include both the projected image 104 and a scanning light beam. The scanning light beam may be emitted by a self-mixing interferometry sensor within the electronic device 106. The self-mixing interferometry sensor may be used to detect a touch, press, or other interaction with the projected image 104, as will be described below. The scanning light beam may be a laser beam, and may be infrared or ultraviolet light, for example, so as not to be visible to a user.

In some embodiments, a user's positions, gestures, or motions within the three-dimensional (3D) space between the electronic device 106 and the input surface 102 may be detected using the scanning light beam, as will be described in more detail below. For example, a detection of a lift of a finger off the input surface 102 can be used to indicate an end of a scroll command, a zoom command, or another command. The 3D space between the electronic device 106 and the input surface 102 will be referred to herein as the field of view of the electronic device 106.

Figure 1B:
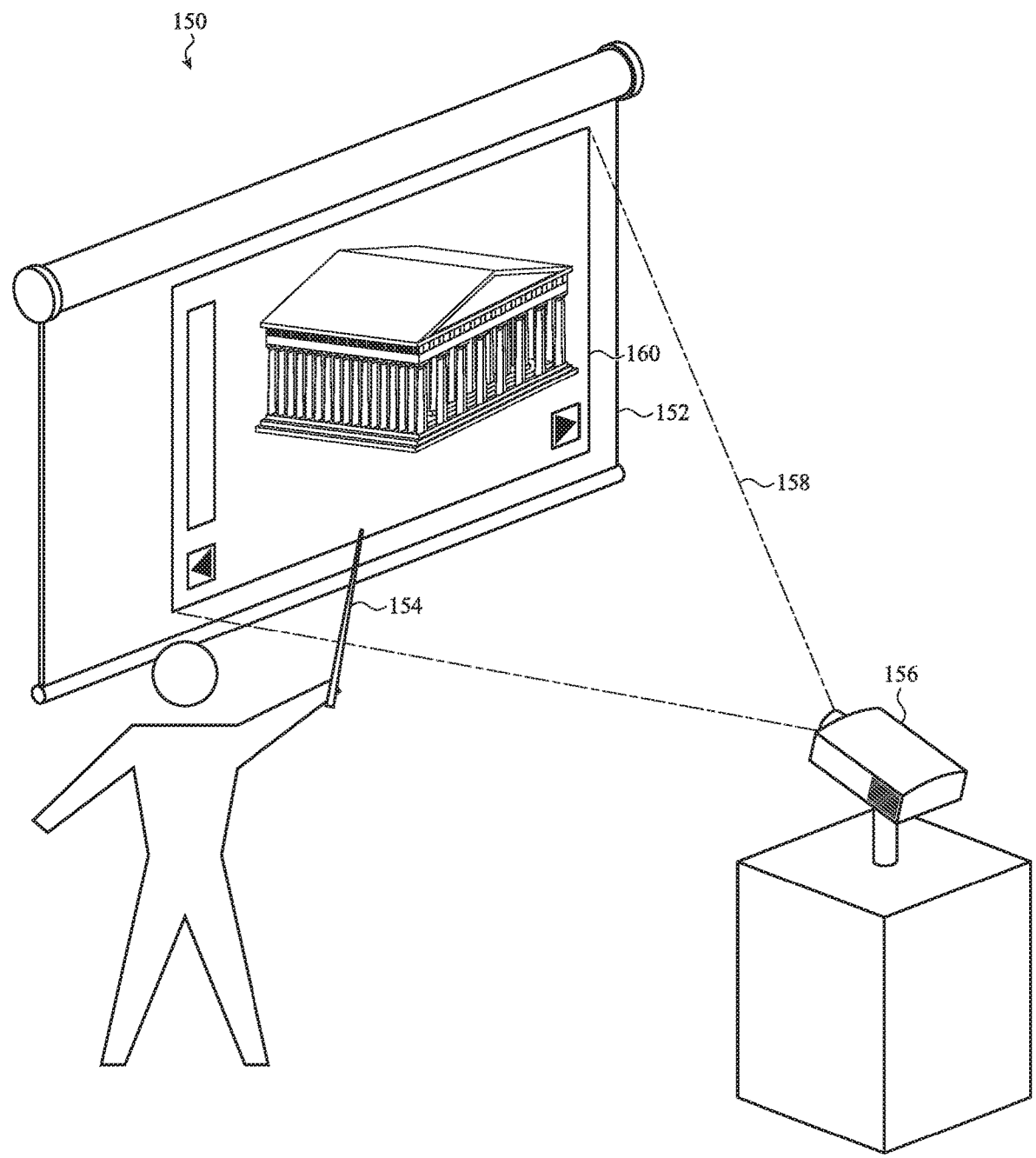
FIG. 1B illustrates an electronic device for projecting an image onto an input surface and receiving user input by user interaction with the input surface, according to an embodiment.

FIG. 1B illustrates an alternate configuration 150 in which another electronic device 156 is operable to project an image 160 onto an input surface 152 and receive user inputs based on a detection of a user, or a tool of a user, touching or pressing on the input surface 152. In the configuration 150, the tool of the user is a stylus or pointer device 154 with which the user can press or touch the input surface 152 to enter a command to the electronic device 156.

The light 158 emitted from the electronic device 156 may include a scanning light beam component (such as from a laser diode) to detect distances to the input surface 152. The distances to the input surface 152 may be determined in an initial setup or initiation phase when the electronic device 156 begins operation. In this way, the electronic device 156 may determine the position and orientation of the input surface 152 in the field of view. In some embodiments, the size of the projected image 160 can be adjusted as part of the initial setup and to assist in subsequent detection of user interactions with the projected image 160. Further, by detecting the limits (e.g., the locations or positions of the edges and/or corners) of the input surface 152, the electronic device 156 can adjust the projection of the image 160 to correct for parallax or other distortions. Alternatively, the position of the input surface 152 in the field of view may be detected or inferred concurrently with detection of an object that is positioned in the field of view. For example, planar surface sections detected at larger distances in the field of view may be interpolated to infer the position input surface 152.

The scanning of the input surface may also allow the electronic device 156 to project the image 160 onto a curved surface (not shown) so as to counteract distortion of the image that would arise from the curvature of the input surface. For example, in an initial setup operation, such a curved input surface could be scanned and distances from the electronic device 156 to the input surface determined for each direction of emission of the light beam. The electronic device may then be able to determine a topography or three-dimensional shape of the input surface, such as its position, orientation, difference from planarity, and other shape characteristics and values. The electronic device 156 can then alter how the image is projected.

In another configuration, various embodiments of the scanning and distance detection systems described below may be used as part of an augmented reality or virtual reality (AR/VR) device. For example, such a scanning and distance detection system could create an image on the goggles of a user headset of an AR/VR system so that the user perceives an input surface suspended a further distance in front of the user. Though no physical input surface exists, the user may be able to interact with the system by physically putting a finger or other user input object at a distance in front of the goggles that corresponds to the projected distance to the virtual input surface.

Figure 2A:
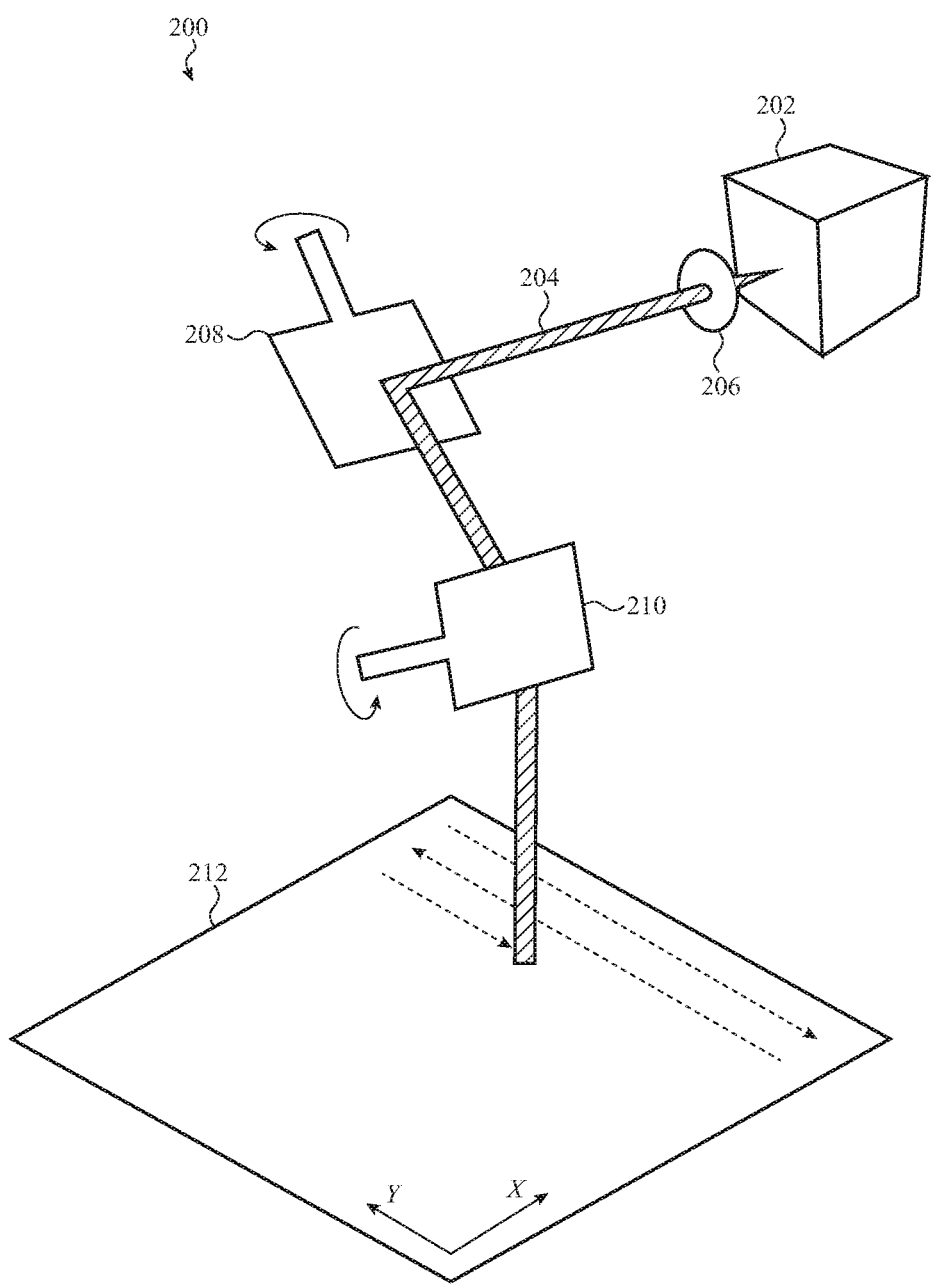
FIG. 2A illustrates a scanning system for detecting objects and an input surface in a field of view, according to an embodiment.
Figure 2B:
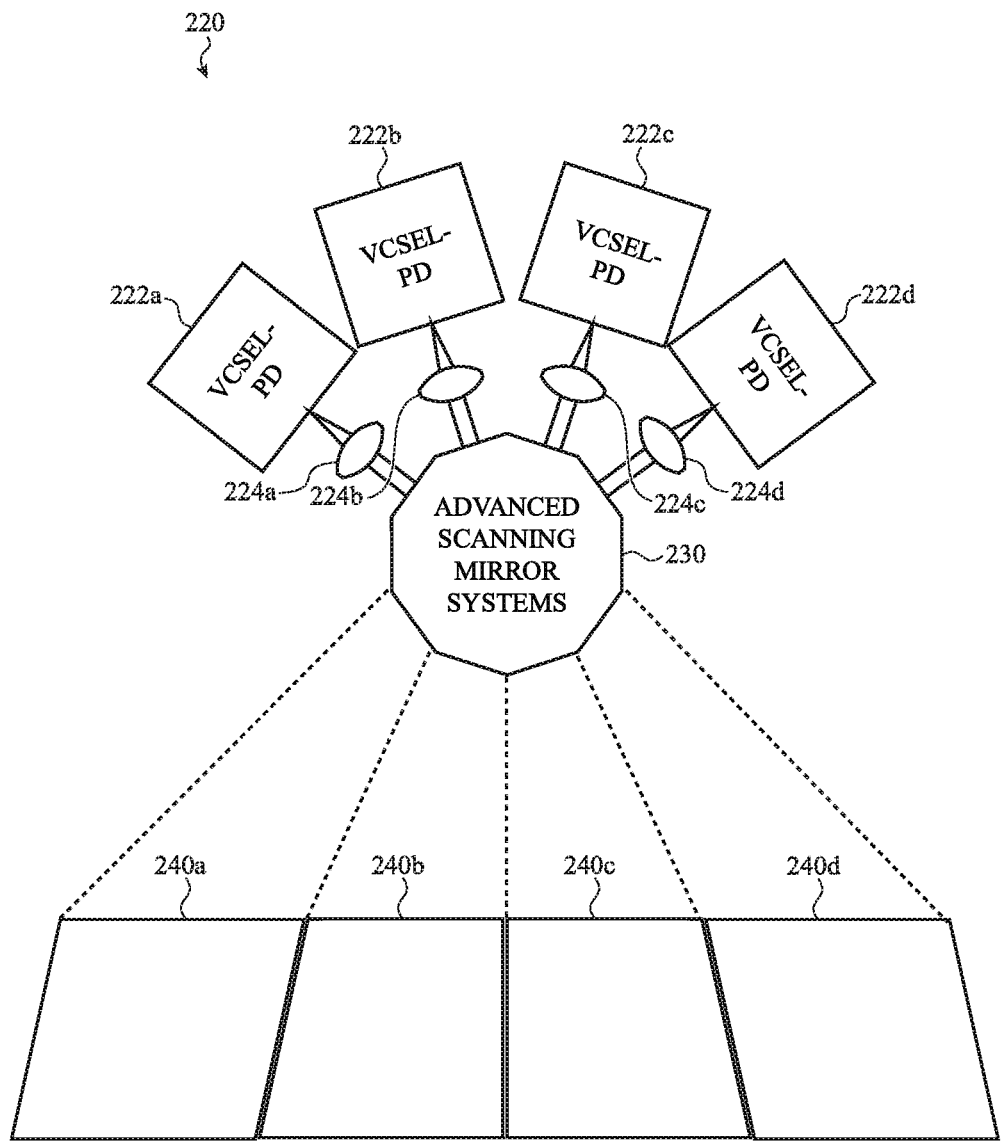
FIG. 2B illustrates a scanning system with multiple light sources for detecting objects and an input surface in a field of view, according to an embodiment.
Figure 2C:
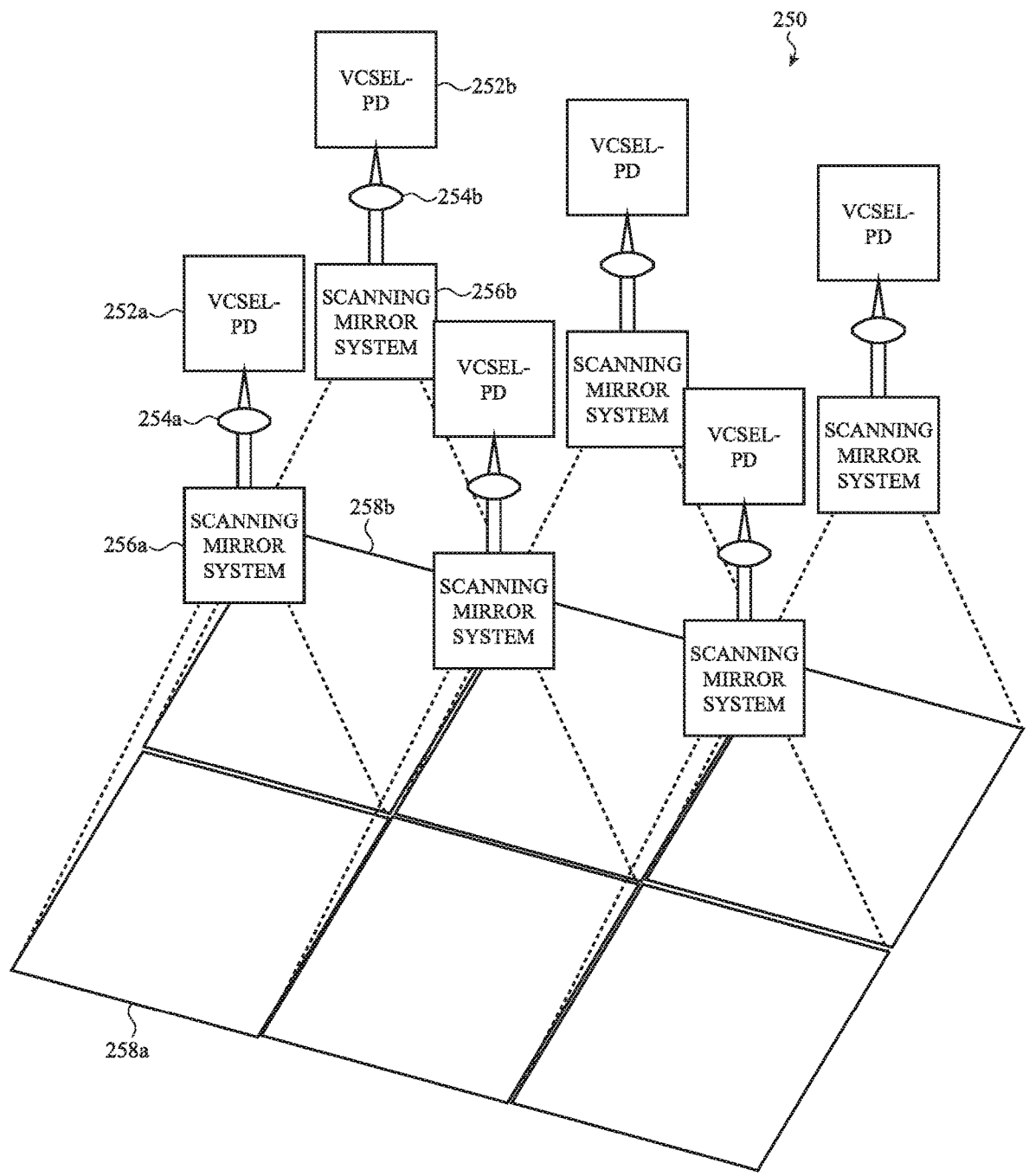
FIG. 2C illustrates a scanning system with multiple light sources for detecting objects and an input surface in a field of view, according to an embodiment.

FIGS. 2A-C illustrate various devices and systems for scanning a field of view, and an input surface in the field of view, with a beam of light (or just "light beam"), as may be used in various embodiments. The devices and systems may be used as part of the electronic devices discussed above that use scanning to detect an object contacting (e.g., touching or pressing) the input surface to cause a user input. The various devices and systems may use one or more light sources to scan the field of view. The light sources may be laser light sources, such as laser diodes. One type of laser diode that may be used is a vertical cavity, surface-emitting laser (VCSEL) diode, though other types of laser diodes may be used, as described further below. A VCSEL diode is able to undergo self-mixing interference (SMI), and such SMI can have a measurable effect on an interferometric property of an electrical component. The effect may be correlated with a distance between the laser light sources and the object or input surface. Each of the exemplary scanning systems described in FIGS. 2A-C may be a component of the electronic device 106 or 156 described above, or of another embodiment, and the corresponding input surfaces described below may, for example, include an area encompassing the projected image 104 or 160.

FIG. 2A illustrates a scanning system 200 operable to scan an input surface 212. The scanning may be performed row-by-row, as indicated. Alternatively, another scan pattern may be used. The scanning may be performed sufficiently rapidly to allow the scanning system 200 to work in concert with video images projected onto the input surface 212.

The scanning system 200 includes at least one self-mixing interferometry sensor (also, just "self-mixing interferometer") 202 that includes a light source emitting a light beam 204. The light source may be a laser emitter, and the emitted light beam 204 may be a laser beam. The light beam 204 may pass through a collimating lens 206 for increased working distance range.

The scanning system 200 may also include two movable mirrors 208 and 210 to redirect the emitted light beam 204 onto the input surface 212. The first mirror 208 may be operable to direct the light beam 204 to scan across the X-axis direction, according to the coordinate system shown on the input surface 212. The second mirror 210 may be operable to direct the light beam 204 to scan across the input surface 212 in the Y-axis direction. While FIG. 2A shows the scanning being performed across the Y-direction for each step along the X-axis, in other embodiments the scanning may scan the X-direction for each step along the Y-axis. In still other embodiments, another scan pattern of the scanning may be used.

The two movable mirrors 208 and 210 may be implemented as micro electro-mechanical systems (MEMS). For example, their movements may be controlled by piezoelectric structures (not shown).

The self-mixing interferometry sensor 202 may be operable to receive reflections of the light beam 204 from the input surface 212 so that its light source undergoes self-mixing interference. As described further below, the self-mixing interference may measurably alter an interferometric parameter of the light source or of an associated component such as a photodetector. The alteration of the interferometric parameter due to self-mixing interference may produce a measurable alteration of a signal, referred to herein as a "self-mixing interferometry signal," within the self-mixing interferometry sensor. The scanning system 200 may then analyze the self-mixing interferometry signal and determine a distance to either the input surface 212 or an intervening object (not shown). A speed of the analysis of the signal and the resulting distance determination may be on a time scale much shorter than the speed of the scan across the input surface 212, so that the speed of the scan does not affect the distance determination.

FIG. 2B illustrates another example scanning system 220 that includes multiple self-mixing interferometry sensors 222a-d to allow concurrent scanning of respective sections 240a-d of an input surface. The various components of the scanning system 220 may be as described for the scanning system 200. The self-mixing interferometry sensors 222a-d include light sources that emit respective light beams toward scanning mirror system (or systems) 230. The light beams may be directed through respective collimating lenses 224a-d before impinging on the scanning mirror system 230. In the scanning system 220, the self-mixing interferometry sensors 222a-d include respective VCSEL diodes and associated photodetectors (PDs). Further details of the functionality of the self-mixing interferometry sensors 222a-d will be given below.

The scanning mirror system 230 may include one or more mirrors to direct the respective light beams from the light sources of the self-mixing interferometry sensors 222a-d respectively onto the sections 240a-d of the input surface. Each of the self-mixing interferometry sensors 222a-d may then receive respective reflected light from either the sections 240a-d, or from intervening objects (not shown). Each of the sections 240a-d may be separately and concurrently scanned, such as with a scan pattern described above. In this way the entire input surface may be scanned in a fourth of the time that would be needed with a single self-mixing interferometry sensor and a single light source, as in the scanning system 200. While the scanning system 220 shown in FIG. 2B uses four self-mixing interferometry sensors 222a-d, one skilled in the art will recognize that other embodiments may use more or fewer self-mixing interferometry sensors to scan respective sections of an input surface.

The scanning system 220 may be configured so that the four self-mixing interferometry sensors 222a-d can receive reflections of their emitted light beam from the respective sections 240a-d, and undergo SMI. Self-mixing interferometry signals derived from the SMI, as described in detail below, may then be used to determine distances from the four self-mixing interferometry sensors 222a-d to their respective sections of 240a-d of the input surface, or to an intervening object (not shown).

FIG. 2C shows another example scanning system 250, similar to that of scanning system 220, that makes use of multiple self-mixing interferometry sensors. The scanning system 250 includes at least the self-mixing interferometry sensors 252a-b, whose emitted light beams are directed through respective collimating lenses 254a-b and scanning mirror systems 256a-b to scan respective sections 258a-b of an input surface. The scanning system 250 is similar to the scanning system 220 of FIG. 2B, except that in the scanning system 220 of FIG. 2B, the sections 240a-d each cover a strip the whole length of the input surface. In contrast, in the scanning system 250, the whole input surface is subdivided both horizontally and vertically into respective sections, as shown.

An advantage of such a subdivision of the input surface is that the MEMS mirrors in the scanning mirror systems, such as scanning mirror systems 256a-b, may need less deflection to complete respective scans of smaller sections of the input surface.

Similar to scanning system 220 of FIG. 2B, the scanning system 250 may include self-mixing interferometry sensors based on VCSEL diodes and associated PDs. Also similar to scanning system 220 of FIG. 2B, the scanning system 250 may include collimating lenses, such as collimating lenses 254a-b, to focus and/or help direct the emitted laser light.

The three scanning systems, 200, 220, and 250, above, and their respective self-mixing interferometry sensors are described as making use of VCSEL diodes to produce laser light and associated PDs to detect it. However, other types of laser diodes may be used, such as edge emitting lasers, quantum cascade lasers, quantum dot lasers, or another type. While the exemplary embodiments for detecting user input are described below as including both laser diodes and associated PDs, other embodiments may not include an PD. In such other embodiments, the measured interferometric parameter used to determine distance or displacement may be a parameter of the laser diode itself, such as a junction voltage or current, a power level, or another parameter.

FIGS. 3A-D show exemplary configurations or structures of laser diodes and associated photodetectors (PDs) that may be included in the self-mixing interferometry sensors of various embodiments. Such self-mixing interferometry sensors may be used in the scanning systems described in FIGS. 2A-C. In these four examples, the laser diode is assumed to be a VCSEL diode, or a variant, though embodiments may use other types of laser diodes. These configurations are exemplary, and should not be construed as limiting.

Figure 3A:
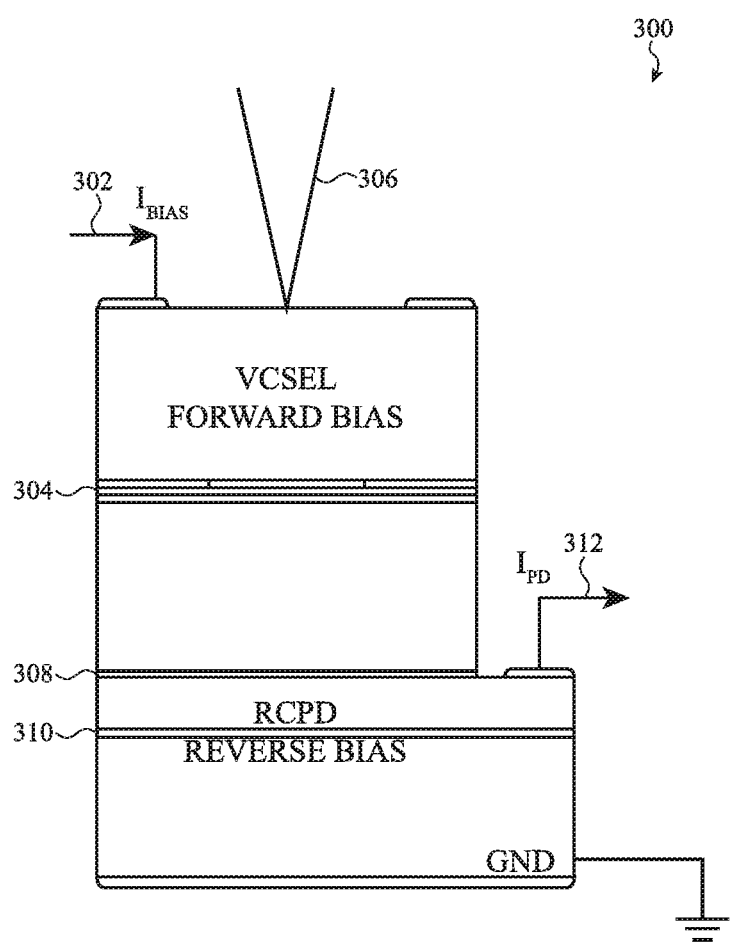
FIG. 3A illustrates a VCSEL diode with an integrated intra-cavity photodetector, according to an embodiment.

FIG. 3A shows a structure 300 for a VCSEL diode with an intrinsic (or "integrated") intra-cavity PD. The structure 300 can be formed in a single semiconductor wafer, and includes a VCSEL diode having an active gain region 304. At forward bias, a bias current 302 $I_{BIAS}$ flows through the VCSEL diode to cause it to emit laser light 306 from its top surface. A photodetector 310 can be embedded in the bottom distributed Bragg reflector mirror of the VCSEL diode to detect the laser light, including laser light that has undergone self-mixing interference (SMI). The photodetector 310 can be interpreted as a resonant cavity photodetector (RCPD) with a resonance wavelength that is matched to the emission wavelength of the laser. There may be an etch stop layer 308 forming a boundary between the VCSEL diode lasing cavity 304 and the PD 310. During emission of laser light 306, for a resonant cavity photodetector, the PD 310 is reversed biased so that a photodetector current 312 $I_{PD}$ flows from the RCPD 310.

During emission of the laser light 306, SMI may occur due to reception in the cavity of reflections of the laser light 306. The SMI may cause variations in the photodetector current 312 $I_{PD}$ that correlate with distance or displacement to the object or input surface causing the reflections.

Figure 3B:
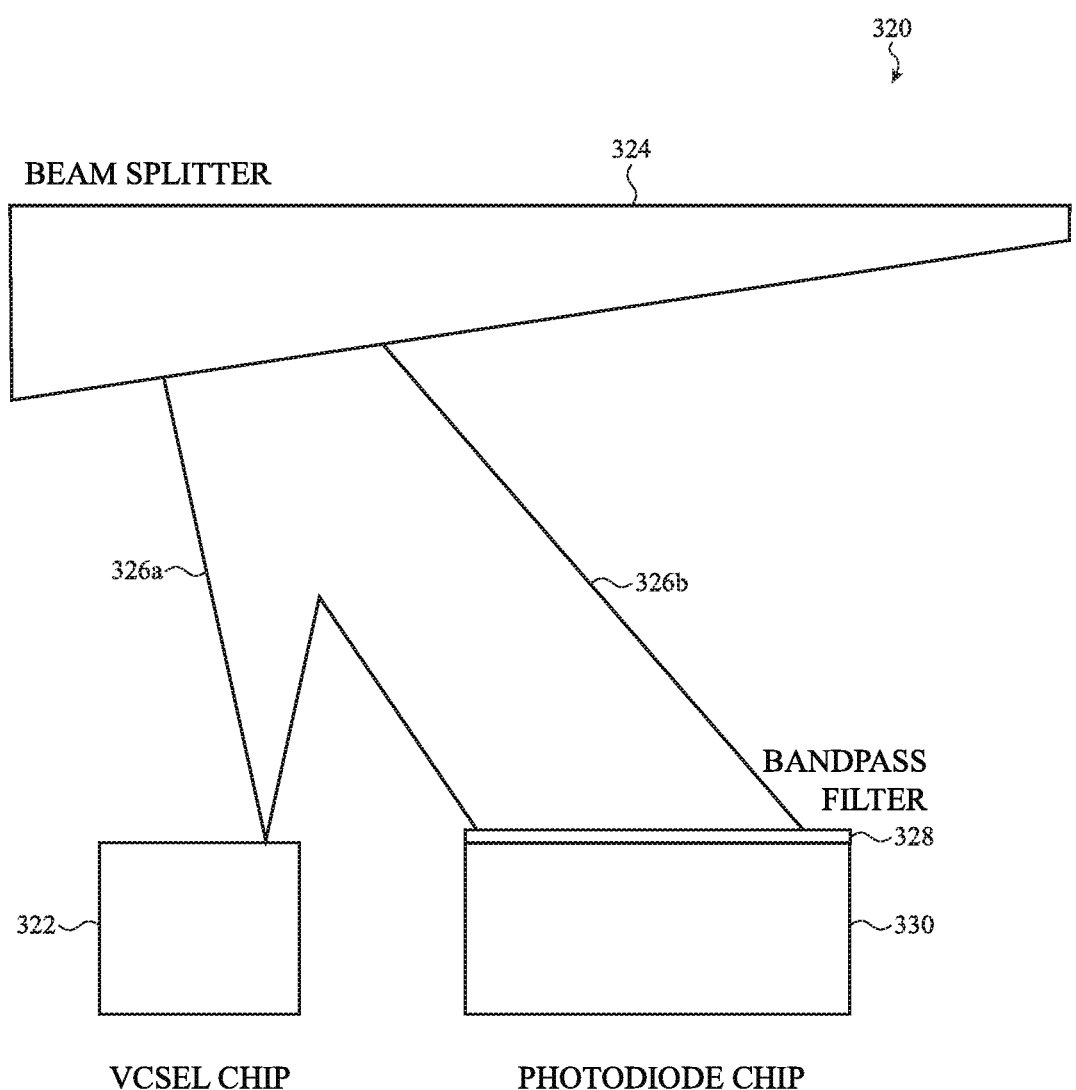
FIG. 3B illustrates a VCSEL diode associated with a separate photodetector, according to an embodiment.

FIG. 3B shows a structure 320 for part of a self-mixing interferometry sensor in which VCSEL diode 322 is used in conjunction with an extrinsic PD 330 located on a separate chip within a self-mixing interferometry sensor. The VCSEL diode 322 emits a beam of laser light 326a. The emitted beam of laser light 326a may traverse a beam splitter and be directed by components of a scanning system into a field of view of a self-mixing interferometry sensor. Reflections of the emitted beam of laser light 326a from an input surface or an intervening object may be received back into the VCSEL diode 322 and cause SMI. The SMI alters a property of the emitted beam of laser light 326a, such as the optical power, to a new steady state value.

Some of the altered beam of emitted beam of laser light 326a is diverted by the beam splitter 324 to become the diverted beam of laser light 326b that is received by the PD 330. The distance between the VCSEL diode 322 and the beam splitter 324 may be on the order of 100 to 250 μm, though this is not required. The PD 330 may include a bandpass filter 328 to eliminate light at wavelengths different from that of the diverted beam of laser light 326b. An interferometric parameter, such as current, of the PD 330 may be monitored, and variations therein used by other components of the self-mixing interferometry sensor to determine distances from the self-mixing interferometry sensor to the input surface or intervening object.

Figure 3C:
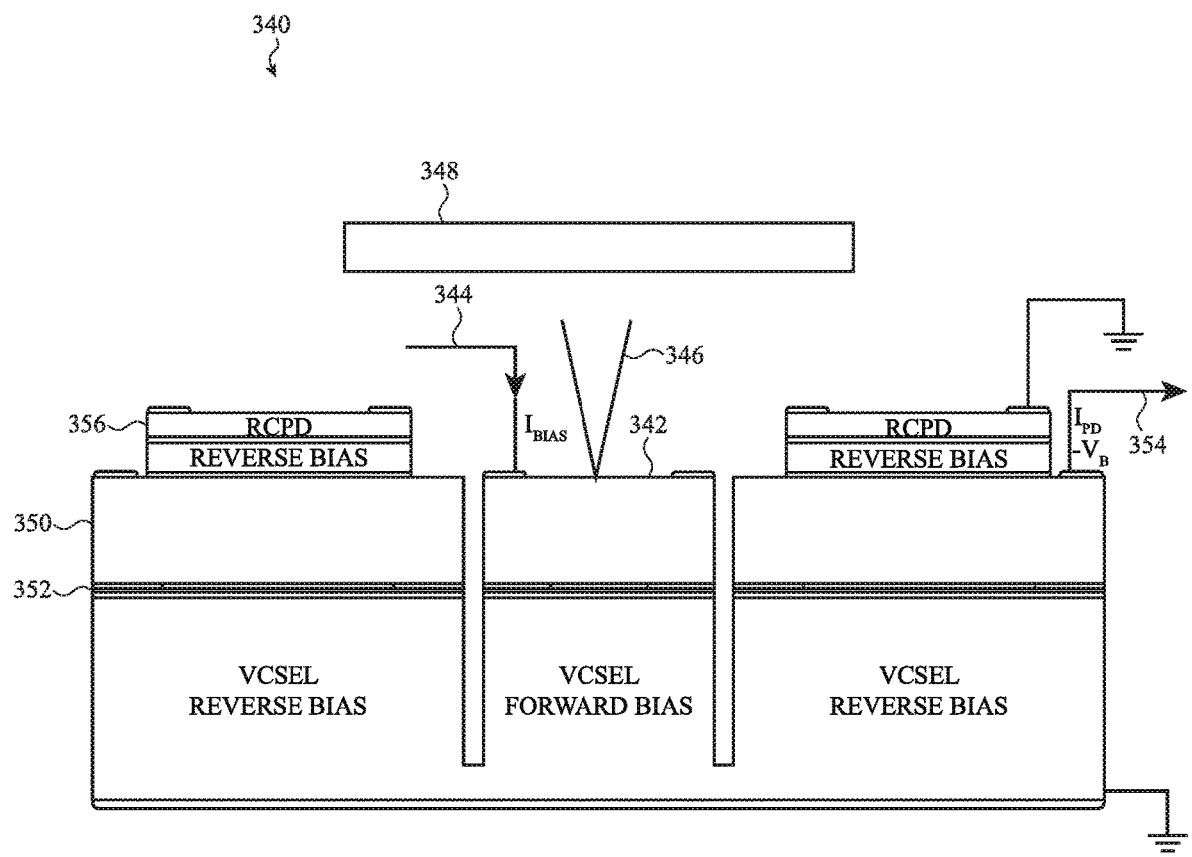
FIG. 3C illustrates a VCSEL diode with an extrinsic, on-chip photodetector, according to an embodiment.

FIG. 3C shows a structure 340 for part of a self-mixing interferometry sensor having VCSEL diode 342 and an extrinsic, on-chip PD 356. The PD 350 may be a RCPD as described above. The RCPD 356 may form an annular disk around the VCSEL diode 342. In the structure 340, the RCPD 356 may be positioned over associated reverse biased VCSEL diode 350 having a quantum wells at layer 352 in order to make the fabrication process easier. In other embodiments, reverse biased VCSELs may not exist and the RCPD could be in direct contact with the substrate on which the VCSEL is located.

In operation, the VCSEL diode 342 is forward biased so that it emits laser light beam 346, and bias current, $I_{BIAS}$, 344 flows through it. The associated VCSEL diode 350 is reverse biased to prevent it from lasing. The laser light beam 346 is directed into the field of view during a scan. The laser light beam may be reflected from an input surface or intervening object in the field of view during the scan, and cause SMI in the VCSEL diode 342 that alters the optical power of the emitted laser light beam 346. Reflections of the altered emitted laser light beam 346 may be diverted by the beam splitter 348 and received by the RCPD 356. During the scan, the RCPD 356 is reverse biased and produces photodiode current, $I_{PD}$, 354. The photodiode current 354 is generated in response to the laser light 346 partially reflected from the beam splitter 348. The photodiode current 354 may vary due to the SMI and such variation may be used to determine distances to the input surface or intervening object in the field of view.

Figure 3D:
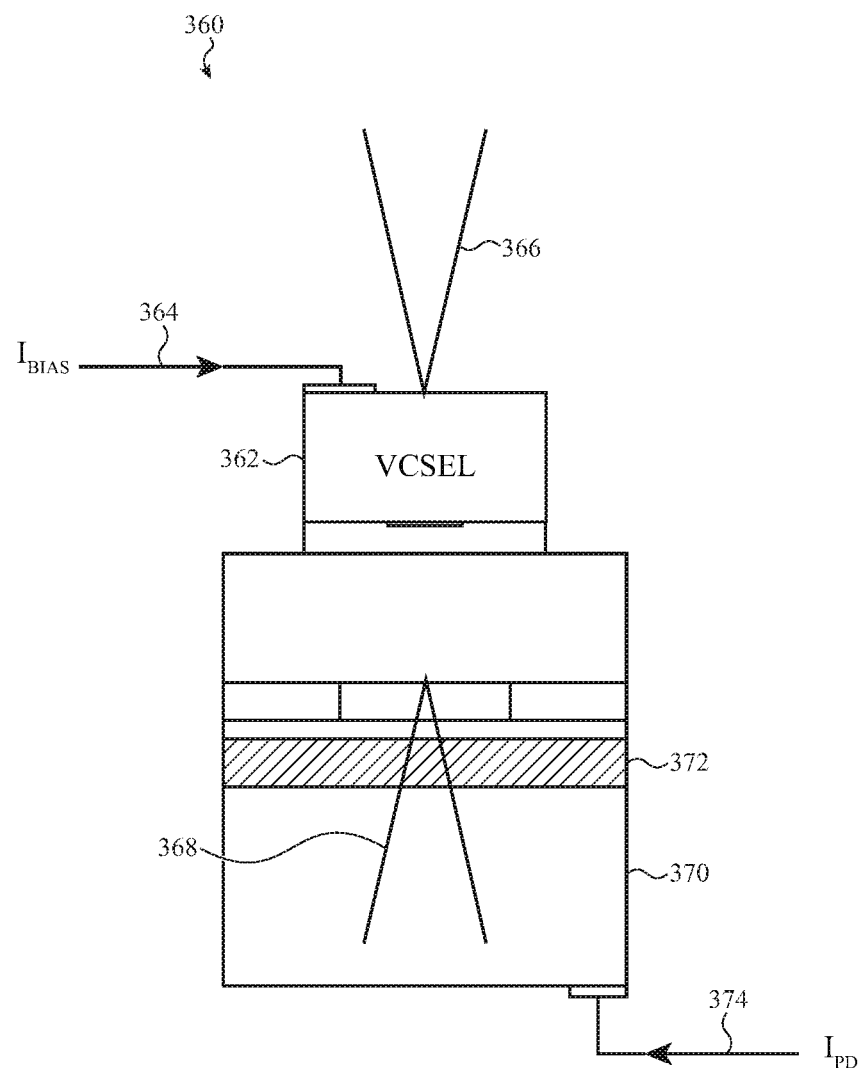
FIG. 3D illustrates a VCSEL diode with an extrinsic, off-chip photodetector, according to an embodiment.

FIG. 3D shows a structure 360 for part of a self-mixing interferometry sensor having dual emitting VCSEL diode 362 and an extrinsic, off-chip PD 370. During forward bias, the dual emitting VCSEL diode 362 emits a beam of laser light 366 from its top surface, which can be directed by components of a self-mixing interferometry sensor toward a field of view during a scan operation. The dual emitting VCSEL diode 362 also emits a second beam of laser light 368 from a bottom surface toward a PD 370. The dual emitting VCSEL diode 362 may be formed in a first semiconductor chip and joined to another chip in which the PD 370 is formed, with the joining such that the second beam of laser light 368 enters the PD 370. A connecting layer 372 between the two chips may allow the second beam of laser light 368 to be transmitted to the PD 370.

As in the previous structures, the first beam of laser light 366 may be reflected from an input surface or intervening object in the field of view, with the reflections causing SMI in the VCSEL diode 362. The SMI may alter both the first beam of laser light 366 and the second beam of laser light 368. The alteration may cause a correlated change in an interferometric parameter of the structure 360, such as the photodetector current, $I_{PD}$, 374 in the PD 370. Distances or displacements of the input surface or intervening object may be determined using the correlated changes, such as described below in relation to FIGS. 7A-10.

Figure 4A:
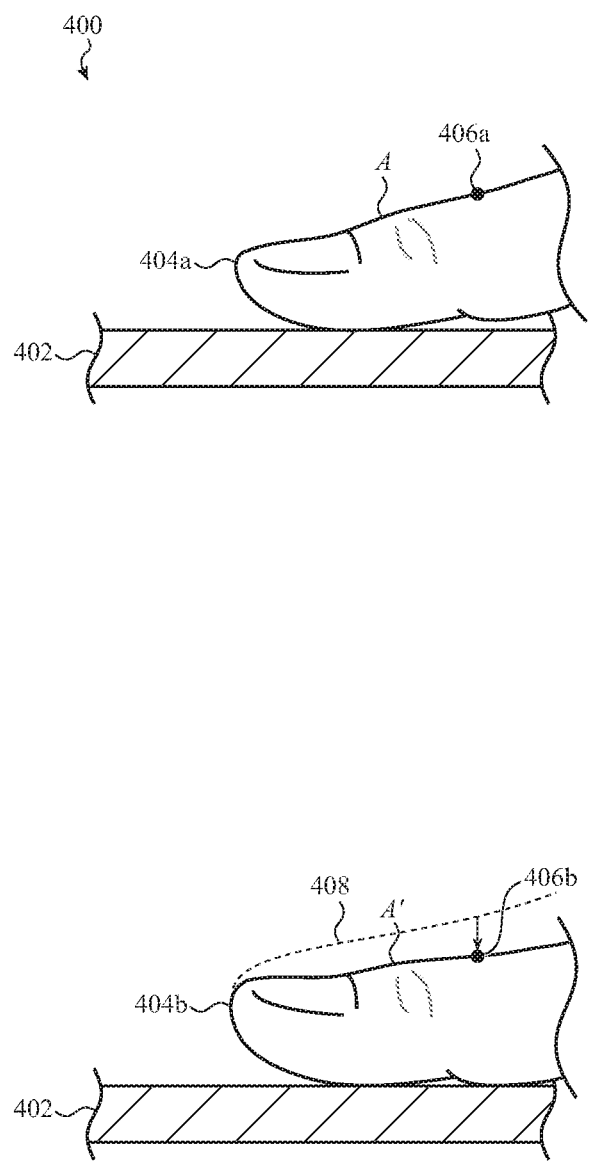
FIG. 4A illustrates a detectable deformation of a user's finger against an input surface, according to an embodiment.
Figure 4B:
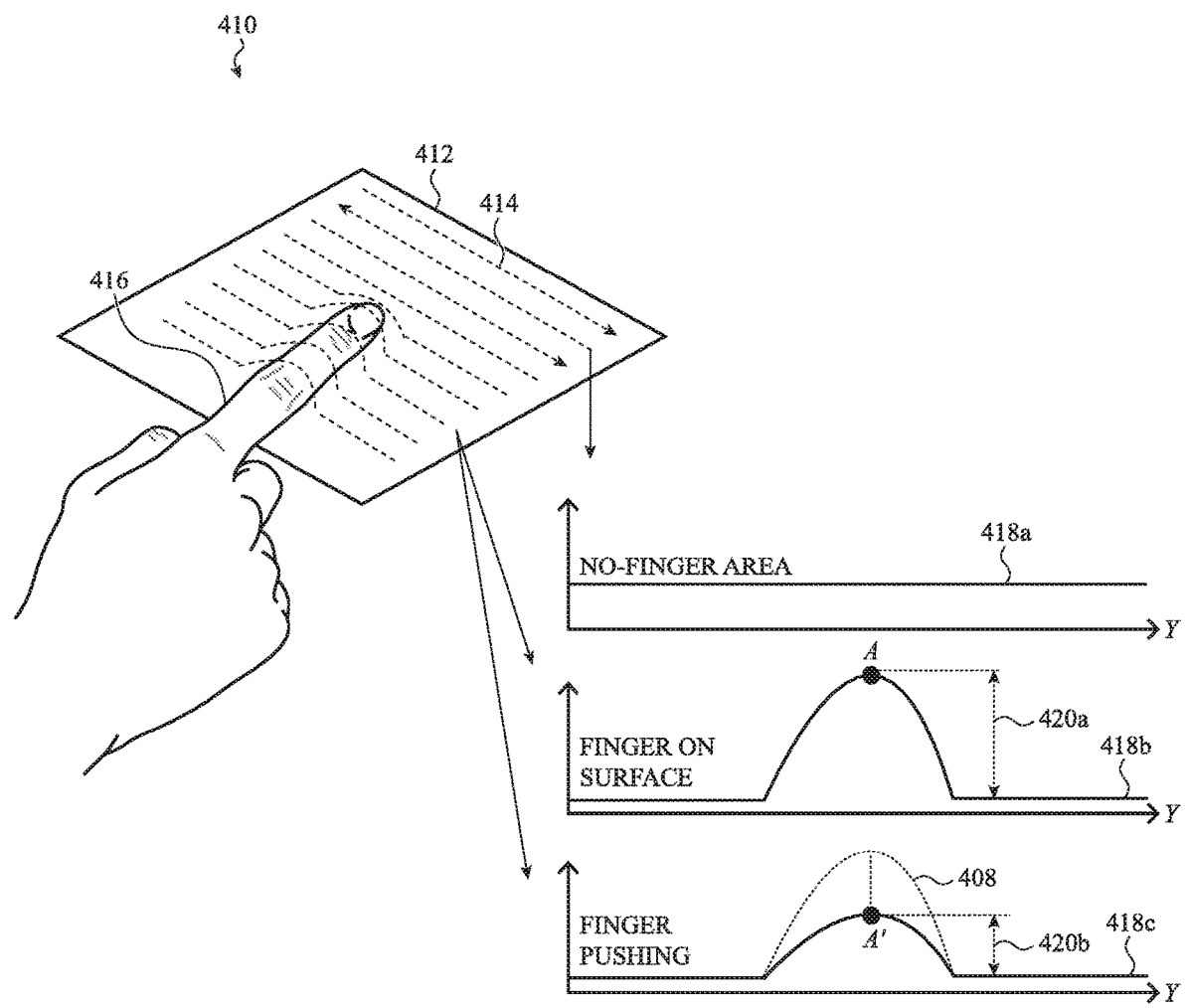
FIG. 4B illustrates a scanning system detection of a deformation of a user's finger, according to an embodiment.

FIGS. 4A-B illustrate how a self-mixing interferometry sensor, able to determine distances at a sufficient resolution, may be used as part of a scanning system to detect a user input, such as a finger or stylus press on an input surface. The resolution may allow the self-mixing interferometry sensor to distinguish between a press user input and a touch user input. While the descriptions below use the example of a finger as a user input object, one skilled in the art will recognize that the descriptions also apply to the case of a different user input object causing the press or touch user input, such as another body part, a pointer, a stylus, or another object.

FIG. 4A shows two stages 400 of a press input by a user's finger against an input surface 402. At the first stage shown in the top of FIG. 4A, an uncompressed user's finger 404a touches the input surface 402. A top surface, A, of the uncompressed user's finger 404a is directed toward a self-mixing interferometry sensor (not shown). A particular reference position 406a on the user finger is located at a first height above the input surface 402.

At the second stage shown in the bottom of FIG. 4A after the user's finger 404b has pressed or applied a force against the input surface 402. The top surface, A', of the user's finger 404b has moved closer to the input surface 402 with a consequent deformation of its resting baseline shape or topography due to compression. The deformation is indicated with respect to the uncompressed position 408 of the top of the user's finger 404a. The particular reference position 406a has now moved closer to input surface 402 and to the updated position 406b.

FIG. 4B illustrates how an intervening object, such as a user's finger 416 or other user input object (e.g., a stylus) may be detected during a scan operation 410. In the scan operation 410 shown, a beam of light from a self-mixing interferometry sensor is directed toward or across the input surface 412 by scanning one row, such as row 414, at a time, and stepping vertically through all rows.

The beam of light can reflect from the either the input surface 412 or the user's finger 416, and cause self-mixing interference in the self-mixing interferometry sensor. A self-mixing interferometry signal correlated with the self-mixing interference may then be used to detect distance to the point of reflection. An initial scan of the field of view in the absence of a user input object or intervening object may allow the electronic device to determine the extent of the input surface within the field of view. Such an initial scan can provide a baseline of distances to locations on the input surface.

Thereafter, in a subsequent scan of the field of view to detect a user input, as the beam of light is directed across a row in which a user's finger 416 is absent, such as row 414, the self-mixing interferometry sensor will detect no changes in the determined distances to the input surface 412. This is indicated by the graph 418a, which shows no displacement of the distances from the baseline distances to the input surface 412.

However, as the scan directs the beam of light across a row for which the user's finger 416 does intervene or form an occlusion between the beam of light and the input surface, the self-mixing interferometry sensor detects changes in the distance between the source of the light beam and the source of the reflections. This is shown in the graph 418b. In the situation as shown in the graph 418b, the user's finger 416 is uncompressed and touches the input surface 412. In this situation, there is a greater displacement or height 420a of a reference position "A" of the user's finger from the input surface 412.

In the case that the user's finger 416 presses against the input surface 412 and becomes compressed and deforms from the uncompressed position 408, there will be smaller changes in the resulting distances detected by the self-mixing interferometry sensor, as shown by the graph 418c. The reference position A' now has a smaller height 420b above the input surface 412.

By determining such graphs of displacements for each row of the scan, a scanning system can form a three-dimensional (3D or "volumetric") topography or map of the finger 416 and its locations and/or positions in relation to the input surface 412. When the scanning operations are sufficiently faster than motion of the finger, the 3D map of the finger may be obtained over multiple scans of the field of view.

Further, the map or 3D topography of the finger 416 obtained during such a scanning operation may be compared to a stored baseline topography of the finger 416 that was obtained in a calibration procedure. The comparison may be used to determine or estimate if the finger 416 is touching the input surface 412 or if the finger 416 is pressing the input surface 412 sufficiently firmly to cause the finger 416 to deform. The calibration procedure, described below in relation to FIG. 6, may obtain baseline topographies of the finger 416 from multiple poses, and in either or both of uncompressed (no deformation) or compressed states.

In various embodiments described herein, electronic devices, such as electronic devices 106 and 156, may include a scanning system, such as one of the exemplary scanning systems shown in FIGS. 2A-C. The scanning system may include one or more light beam sources that undergo self-mixing interference. The light beam sources may include laser diodes and/or photodetectors, such as the exemplary VCSELs described in FIGS. 3A-D. The scanning system may operate according to the methods described next in relation to FIG. 5 to detect a user input by a user input object, such as a finger.

Figure 5:
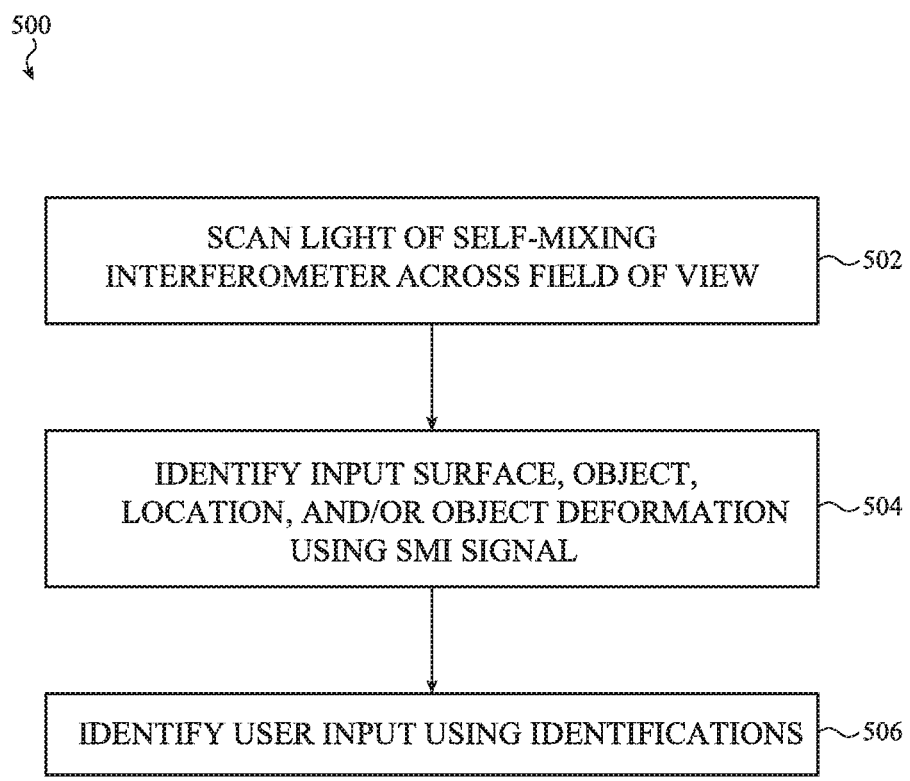
FIG. 5 is a flow chart of a method for identifying a user input, according to an embodiment.

FIG. 5 is a flow chart of an exemplary method 500 for detecting, by an electronic device, a user input on an input surface. The input surface may be separate from the electronic device. The electronic device may also project an image onto the input surface to display virtual equivalents of buttons or keys for the user to touch or press to enter user inputs, such as data or commands.

At stage 502, the electronic device scans a beam of light emitted from a light source of a self-mixing interferometry sensor (or just "self-mixing interferometer") across a field of view that includes an input surface. The scanning operation may be performed with any of the scanning systems 200, 220, or 250 described respectively in FIGS. 2A-C, or with another scanning system. Reflections of the scanned light from either the input surface, or from an object located in the space between the input surface and the self-mixing interferometry sensor, may be received by the light source. This reception of reflected light may cause the light source to undergo self-mixing interference (SMI) due to the received reflections. The SMI may be detectable in values of, or changes in, a self-mixing interferometry signal.

The scanning operation at stage 502 may include multiple sets of scans across the field of view. Any of various scan patterns across the field of view may be used, and may be varied between each scan across the field of view.

At stage 504, one or more sets of distance and/or displacement determinations are made based on the self-mixing interferometry signal. The self-mixing interferometry signal may be of an interferometric parameter of a component of the self-mixing interferometry sensor, such as an electrical parameter of a laser diode or of a photodetector associated with the laser diode. The distances or displacements may allow the electronic device, such as by a processor, to make identifications of an input surface, and of an object that may be intervening between the input surface and the self-mixing interferometry sensor. This may be done by mapping a 3D shape or topography of the object. The topography of the object obtained from the scanning operation may be used to detect whether the object is pressing the input surface sufficiently to become deformed, as compared to a stored baseline topography obtained in a calibration procedure.

The object may also be determined to be a finger of a user, such as by particular features of the topography. In one embodiment, the height of the finger above the input surface is determined based on the distance and/or displacement determinations. The height of the finger above the input surface may be compared to a finger thickness, such as may have been determined in the calibration procedure. Also, stage 504 may include identifying locations of the input surface and the object within a field of view. The location of the object in the field of view may be determined in three dimensions.

At stage 506, a user input is identified based on the determined distances. The user input may be a touch, press, or other interaction at an identified location on the input surface by a finger or other user input object (such as a stylus). An identified location of the interaction on the input surface may correlate with part of an image projected onto the input surface, the part of the projected image being associated with a particular user input. The identified user input may also be a detected motion of the user's finger or stylus, either across the input surface, or toward or away from the input surface. A particular detected motion may indicate a scroll operation, or another operation. For example, a motion or gesture of the user input object away from the input surface may indicate a zoom operation, or an end to a scroll operation.

The user input may be identified as a touch event on the input surface based on absolute distance measurements based on self-mixing interference signals. For example, when the projection device and the input surface, such as electronic device 106 and input surface 102 of FIG. 1A, are fixed in their relative positions, a finger can be identified using absolute distance sensing. The absolute distance profile can then detect that the identified finger is in contact with the input surface. When contact of the finger with the input surface is detected, further scanning can be limited to an area around the finger, or a part thereof, such as the fingertip. Small displacements or compressions of the finger from its rest or uncompressed topography can be used to indicate a touch input.

At stage 506, the method 500 may determine a magnitude of a force applied by the finger during a touch or press input. This determination may be made based on the extent of deformation detected in the finger during the touch or press input. The determined magnitude of the force may be compared to one or more thresholds to identify the intended user input. If there has been little or no compression or deformation of the finger, a "touch" input by the user may be determined to have occurred. This may be inferred based on whether differences between a baseline topography of the finger and its 3D shape obtained during the scanning operation are less than a first threshold. Alternatively, a "press" input by the user may be determined to have occurred when an amount of compression or deformation exceeds a second threshold. The second threshold may be set higher than the first threshold to establish a hysteresis effect.

The identified user input may cause an alteration of the operation of the electronic device. Examples of such altered operations include changing an image projected onto the input surface, accepting data inputs, executing an action by the electronic device (for example, saving a file), or providing a feedback to the user (for example, chiming a bell), among other operations.

In additional and/or alternative methods, the scanning operation may determine an orientation and/or topography of the input surface in the field of view. For example, the edges of a planar input surface may be determined. If the input surface is determined to be oriented at an angle with the respect to the scanning system, the scanning system may adjust the number and distance between row scans, and the electronic device may alter how an image is projected onto the input surface to correct for distortions, such as parallax. In another example, the input surface may be non-planar, and the scanning system and methods may detect its 3D topography in an initiation phase of the scanning operations. The electronic device may use the 3D topography to alter or adjust a projected image, among other examples.

In additional and/or alternative methods, more than one user input object, such as two fingers, may be detected in the field of view. Each such finger or user input object may be separately determined to have a deformation due to pressing the input surface sufficiently firmly. A detected relative motion of two fingers, for example, may be identified as a user input for a zoom or other operation.

In additional and/or alternative embodiments, an electronic device may perform a first set of scans of a field of view with a beam of light emitted from a self-mixing interferometry sensor. The method may include determining, from a self-mixing interferometry signal generated during the first set of scans, a topography of an input surface in the field of view. The method may include projecting an image from an image projector of the electronic device onto the input surface.

Then these additional and/or alternative methods may perform a second set of scans of the field of view. A self-mixing interferometry signal measured by the self-mixing interferometry sensor during the second set of scans may allow the electronic device to detect a first object in the field of view, and to detect a three-dimensional position of the first object in the field of view. A user input to the electronic device may then be determined based on the three-dimensional position of the first object in the field of view.

In still further embodiments, the self-mixing interferometry signal measured by the self-mixing interferometry sensor during the second set of scans may allow the electronic device to determine a three-dimensional motion or gesture of the first object in the field of view, and a user input based on the three-dimensional motion of the first object in the field of view.

In still further embodiments, the self-mixing interferometry signal measured by the self-mixing interferometry sensor during the second set of scans may allow the electronic device to detect a second object in the field of view and its three-dimensional motion or gesture in the field of view, and to determine a user input based on the combination of motions of the first and second objects.

Some of the methods may make use of determinations that the user input object is pressing the input surface, based on detected deformations of the user input object. This is done by comparing a volumetric or 3D map or topography of the input object obtained during a scanning operation with one or more baseline topographies stored in the electronic device. Such baseline topographies may be obtained during one or more calibration procedures, such as those now described with respect to FIG. 6.

Figure 6:
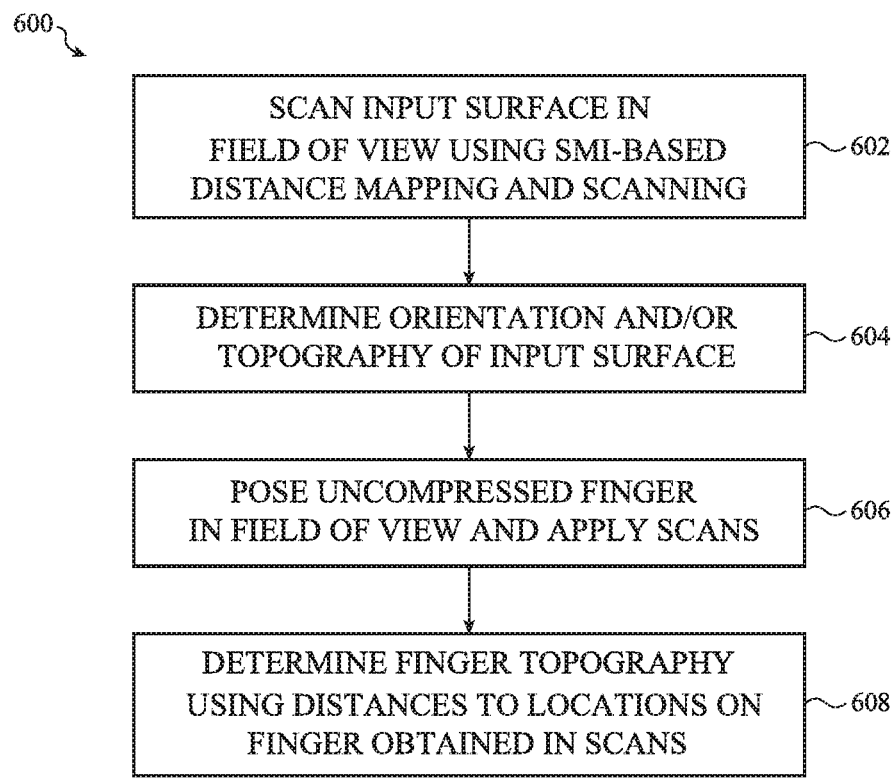
FIG. 6 is a flow chart for calibrating a user's finger for detection of deformation, according to an embodiment.

FIG. 6 is a flow chart of a method 600 for obtaining baseline topographies of a user's finger or other user input object. The baseline topographies obtained in method 600 may be stored in an electronic device for use with the methods described in relation to FIG. 5. Hereinafter, the method 600 is described in relation to the case that the user input object is a user's finger. A person skilled in the art will recognize how method 600 applies to other types of user input objects.

At stage 602, an initial scanning operation of a field of view containing an input surface is performed. The initial scanning operation may use a scanning system, such as one of the examples described in FIGS. 2A-C, that makes use of a self-mixing interferometer. The initial scanning operation may provide background distances to the input surface against which subsequent distances to a finger are compared.

At stage 604, which may be optional, an orientation and/or topography of the input surface may be determined.

The orientation and/or topography may allow the method to adjust for differences in how a finger is posed in subsequent stages.

At stage 606, a user may pose a finger within the field of view between the self-mixing interferometry sensor and the input surface. Multiple scanning operations, such as those illustrated in FIG. 4B, may then be performed which obtain distances between the self-mixing interferometry sensor and the finger.

At stage 608, comparing these distances to the initially obtained distances to the input surface can produce a calibration topography or 3D map of the finger in the field of view. Multiple poses of the finger may be used to obtain multiple such calibration topographies of the finger. The multiple poses may include poses in which the finger is not pressing the input surface, and multiple poses in which the finger is pressing the input surface, and with different magnitudes of force. Various learning algorithms may be applied to allow the electronic device to match a calibration topography obtained from a pose with a topography of the finger subsequently obtained during operation of the electronic device.

The methods and devices described above make use of distances or displacements obtained using self-mixing interference in a light emitted by a self-mixing interferometry sensor. Embodiments for determining such distances or displacements will now be described.

Figure 7A:
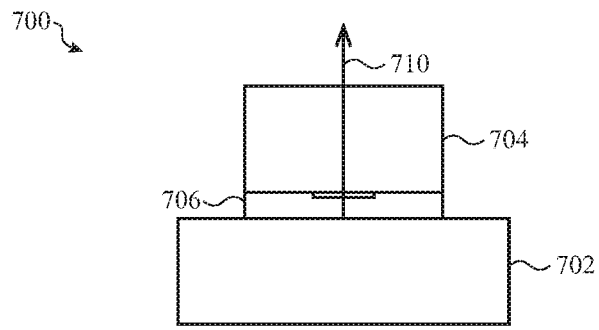
FIG. 7A illustrates a schematic for a self-mixing interferometry light source, according to an embodiment.
Figure 7B:
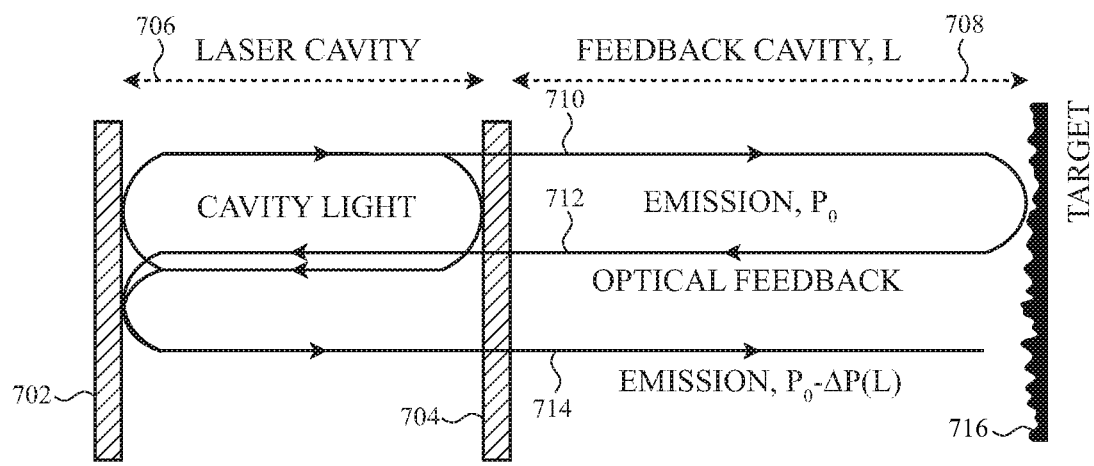
FIG. 7B illustrates self-mixing of laser light, according to an embodiment.
Figure 7C:
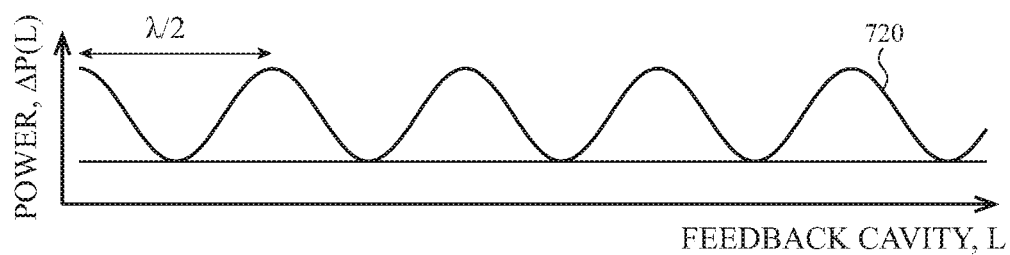
FIG. 7C illustrates a variation in an interferometric parameter due to self-mixing, according to an embodiment.

FIGS. 7A-C illustrate properties of self-mixing interference of emitted light in a light source. The explanations are intended only to describe certain aspects of self-mixing interference needed to understand the disclosed embodiments. Other aspects of self-mixing interference will be clear to one skilled in the art.

FIG. 7A illustrates an exemplary configuration of a laser light source 700, specifically a VCSEL diode 700, that may be used as part of a self-mixing interferometry sensor. In any type of laser, an input energy source causes a gain material within a cavity to emit light. Mirrors on ends of the cavity feed the light back into the gain material to cause amplification of the light and to cause the light to become coherent and (mostly) have a single wavelength. An aperture in one of the mirrors allows transmission of the laser light (e.g., transmission toward a touch input surface).

In the VCSEL 700, there are two mirrors 702 and 704 on opposite ends of the cavity. The lasing occurs within the cavity 706. In the VCSEL diode 700, the two mirrors 702 and 704 may be implemented as distributed Bragg reflectors, which are alternating layers with high and low refractive indices. The cavity 706 contains a gain material, which may include multiple doped layers of III-V semiconductors. In one example the gain material may include AlGaAs, InGaAs, and/or GaAs. The emitted laser light 710 can be emitted through the topmost layer or surface of VCSEL diode 700. In some VCSEL diodes, the coherent light is emitted through the bottom layer.

FIG. 7B shows a functional diagram of self-mixing interference (or also "optical feedback") with a laser. In FIG. 7B, the cavity 706 has been reoriented so that emitted laser light 710 is emitted from the cavity 706 to the right. The cavity 706 has a fixed length established at manufacture. The emitted laser light 710 travels away from the cavity 706 until it intersects or impinges on a target, which may be the input surface 102 of FIG. 1A, or input surface 152 of FIG. 1B, or another input surface. The gap of distance L from the emission point through the mirror 704 of the emitted laser light 710 to the target is termed the feedback cavity 708. The length L of the feedback cavity 708 is variable as the target can move with respect to the VCSEL diode 700.

The emitted laser light 710 is reflected back into the cavity 706 by the target. The reflected light 712 enters the cavity 706 to coherently interact with the original emitted laser light 710. This results in a new steady state illustrated with the new emitted laser light 714. The emitted laser light 714 at the new steady state may have characteristics (e.g., a wavelength or power) that differ from what the emitted laser light 710 would have in the absence of reflection and self-mixing interference.

FIG. 7C is a graph 720 showing the variation in power of the combined emitted laser light 714 as a function of the length L of the feedback cavity 708, i.e., the distance from the emission point through the mirror 704 of the emitted laser light 710 to the target. The graph depicts a predominantly sinusoidal variation with a period of $\lambda/2$. Theoretical considerations imply that the variation is given by the proportionality relationship: $\lambda P \propto \cos(4\pi L/\lambda)$. This relationship generally holds in the absence of a strong specular reflection. In the case of such strong specular reflection, the cosine becomes distorted, i.e., higher harmonics are present in the relationship. However, the peak-to-peak separation stays at $\lambda/2$. For an initially stationary target, this relationship can be used to determine that a deflection has occurred. In conjunction with other techniques, such as counting of the completed number of periods, the range of the deflection may also be determined.

Though the graph 720 shows the variation in power of the combined emitted laser light 714 as a function of the length L of the feedback cavity 708, similar results and/or graphs may hold for other interferometric properties of a VCSEL diode or other type laser diode that are measured by a self-mixing interferometry sensor.

Measurements of one or more interferometric parameters by a self-mixing interferometry sensor can be used to infer distances and/or displacements of the target 716 from the VCSEL 700. These distance or displacement measurements can then be used to determine a user gesture or input against an input surface, as described above. A first family of embodiments uses a spectrum analysis of a signal of an interferometric parameter. A variation in the interferometric parameter is produced when an input signal (e.g., a bias current) of the laser diode is modulated with a triangle wave about a constant current value. The first family of embodiments is described in relation to FIGS. 8A-C.

A second family of embodiments uses time domain filtering and demodulation of a signal of an interferometric parameter. A variation in the interferometric parameter is produced when a bias current of the laser diode is modulated with a sine wave about a constant current value. The second family of embodiments is described below in relation to FIGS. 9A-C and 10.

Figure 8A:
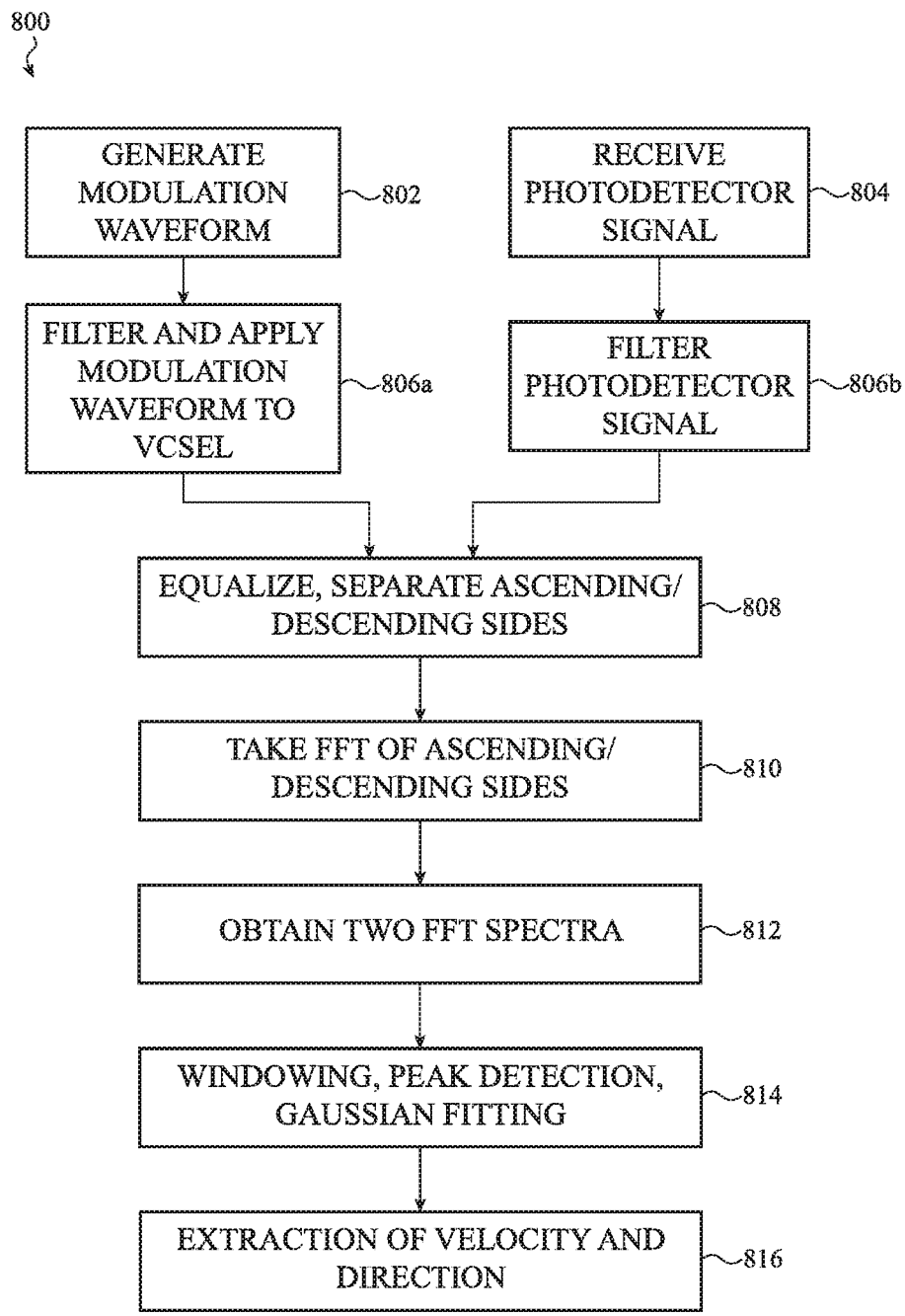
FIG. 8A is a flow chart of a spectrum analysis method for determining distances from a light source to an object using self-mixing interferometry, according to an embodiment.

In regard to the first family of embodiments, FIG. 8A is a flowchart of a spectrum analysis method 800 for determining distances from a self-mixing interferometry sensor to locations on an input surface or to objects within the field of view between the self-mixing interferometry sensor and the input surface. The spectrum analysis method 800 involves applying a triangle wave modulation to a bias current of a laser diode, and applying separate spectrum analyses to the signal of an interferometric parameter obtained during the rising time interval of the triangle wave modulation and to the signal of the interferometric parameter obtained during the falling time interval of the triangle wave modulation. The signal of the interferometric property may be an output signal of a photodetector, such as an output current or voltage, or it may be a signal of an interferometric parameter of the VCSEL itself.

Figure 8B:
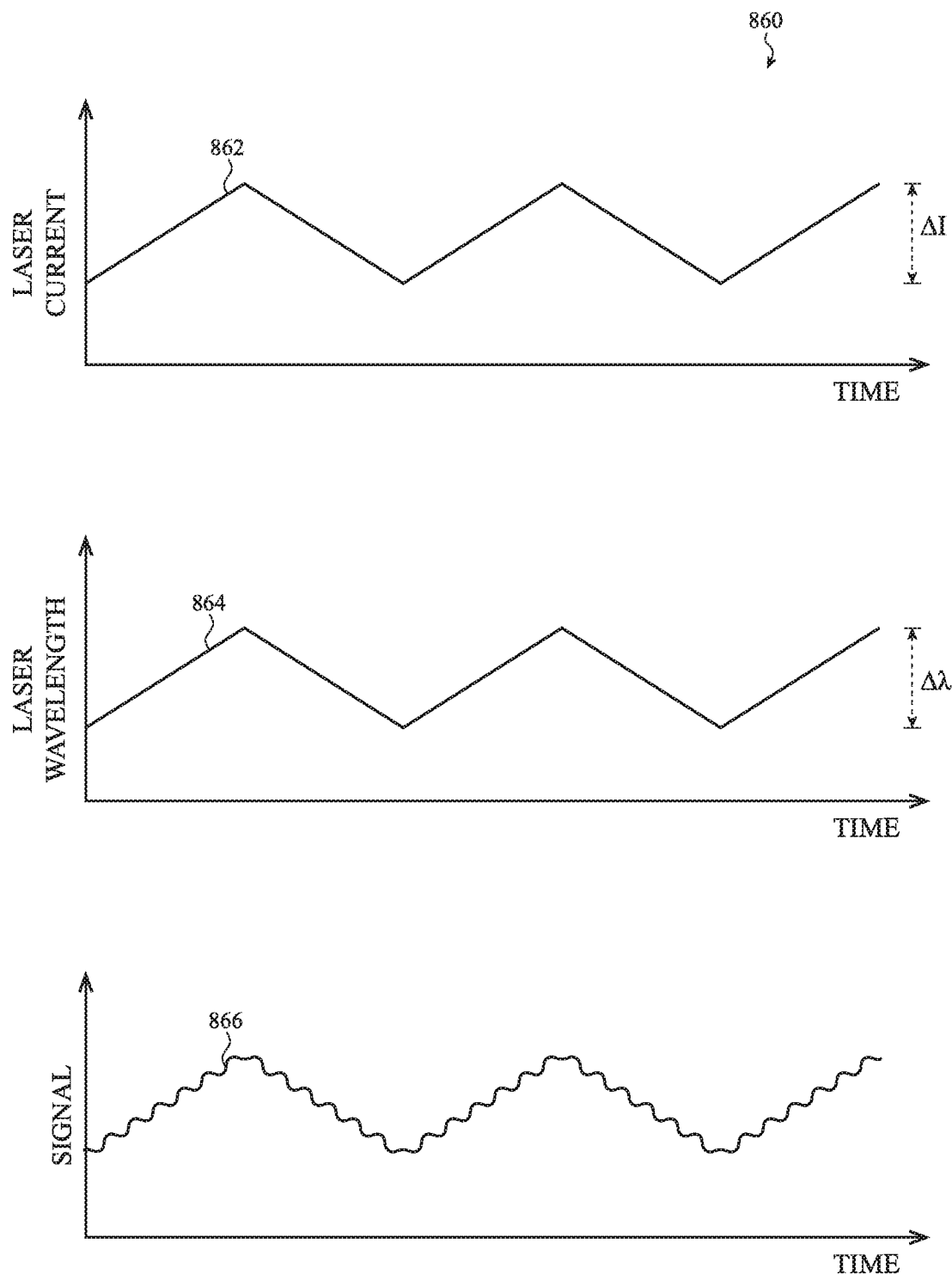
FIG. 8B shows time-correlated graphs of signals that may occur in a self-mixing interferometry sensor, according to an embodiment.

FIG. 8B shows three time correlated graphs 860 relating a triangle modulated laser bias current 862 with the resulting laser wavelength 864 and the resulting signal 866 of the measured interferometric parameter. The graphs 860 in FIG. 8B correspond to a stationary target. While the triangle modulated laser bias current 862 is shown with equal ascending and descending time intervals, in some embodiments these time intervals may have different durations. The spectrum analysis methods may make use of both the triangle modulated laser bias current 862 and the signal 866 of the measured interferometric parameter. In the case of a non-stationary target, the observed frequencies in the resulting signal 866 would differ during the rising and falling time intervals of the bias current 862. Distance and velocity can be obtained by a comparison of the two frequency values.

Returning to FIG. 8A, at stage 802 of the spectrum analysis method 800, an initial signal is generated, such as by a digital or an analog signal generator. At stage 806a the generated initial signal is processed as needed to produce the triangle modulated laser bias current 862 that is applied to the VCSEL. The operations of stage 806a can include, as needed, operations of digital-to-analog conversion (DAC) (such as when the initial signal is an output of a digital step generator), low-pass filtering (such as to remove quantization noise from the DAC), and voltage-to-current conversion.

The application of the triangle modulated laser bias current 862 to the VCSEL induces a signal 866 in the interferometric parameter. It will be assumed for simplicity of discussion that the signal 866 of the interferometric parameter is from a photodetector, but in other embodiments it may be another signal of an interferometric parameter from another component. At initial stage 804 of the spectrum analysis method 800, the signal 866 is received. At stage 806b, initial processing of the signal 866 is performed as needed. Stage 806b may include high-pass filtering.

At stage 808 the processing unit may equalize the received signals, if necessary. For example the signal 866 may include a predominant triangle waveform component matching the triangle modulated laser bias current 862, with a smaller and higher frequency component due to changes in the interferometric parameter. High-pass filtering may be applied to the signal 866 to obtain the component signal related to the interferometric parameter. Also, this stage may involve separating the parts of signal 866 and the triangle modulated laser bias current 862 corresponding to the ascending and to the descending time intervals of the triangle modulated laser bias current 862. The operations may include sampling the separated information.

At stages 810 and 812, a separate FFT is first performed on the parts of the processed form of signal 866 corresponding to the ascending and to the descending time intervals. Then the two FFT spectra are analyzed.

At stage 814, further processing of the FFT spectra can be applied, such as to remove artifacts and reduce noise. Such further processing can include windowing, peak detection, and Gaussian fitting.

At stage 816, from the processed FFT spectra data, information regarding the user input can be obtained, including an absolute distance, and/or a direction and velocity of the input on the input surface. More specifically, the velocity is detected in the direction of the laser light. To detect a drag motion on the input surface, the laser can be mounted or directed to have a tilt with respect to the surface normal of the input surface (i.e., the laser light is not directed perpendicularly to the input surface).

Figure 8C:
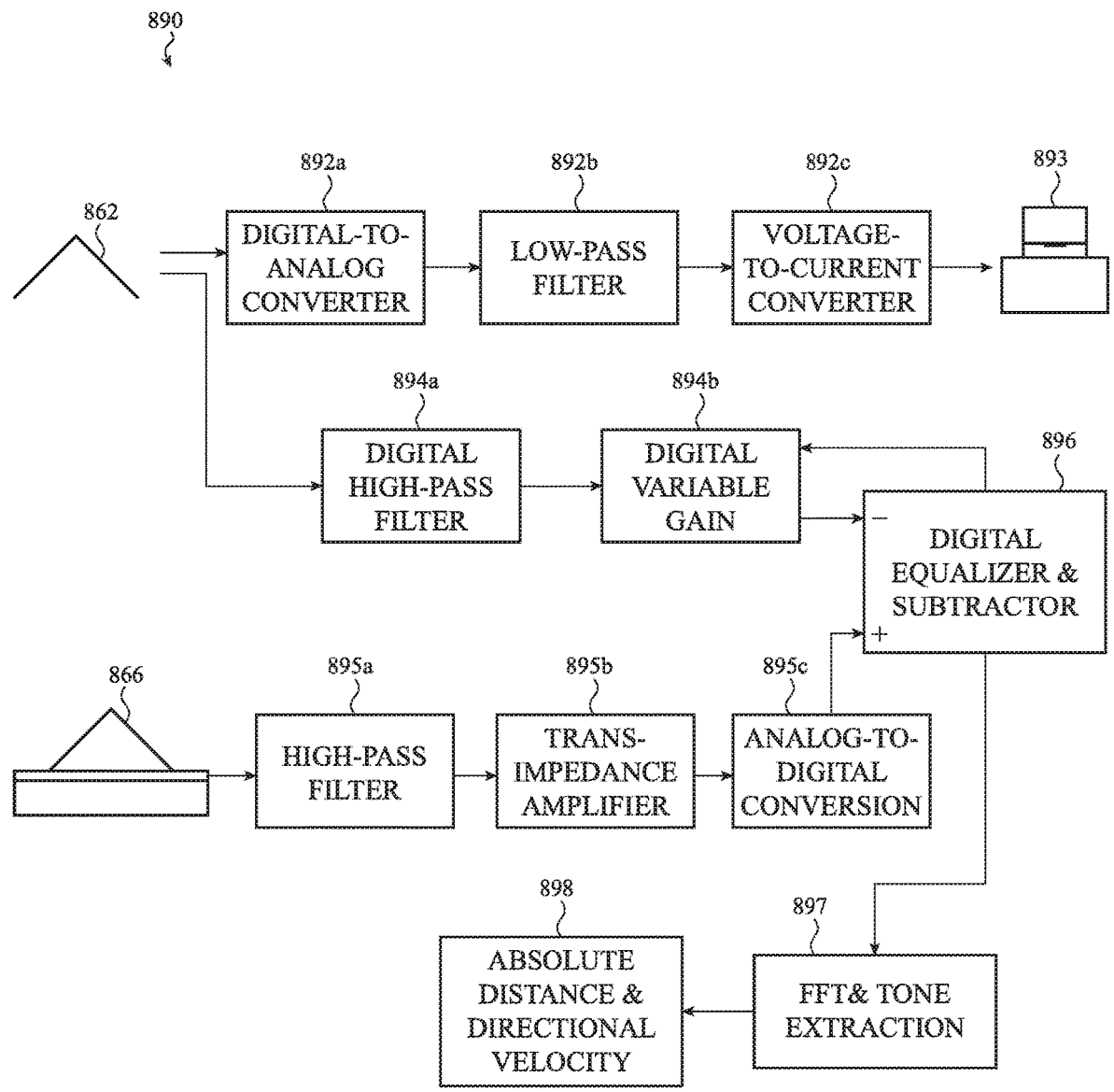
FIG. 8C illustrates a block diagram of a circuit operable to implement the spectrum analysis method for determining distances from a light source to an object using self-mixing interferometry, according to an embodiment.

FIG. 8C shows a block diagram of a system 890 that can implement the spectrum analysis just described in the spectrum analysis method 800. In the exemplary system 890 shown, the system 890 includes generating an initial digital signal and processing it as needed to produce a triangle modulated laser bias current 862 as an input to a bias current of a VCSEL diode 893. In an illustrative example, an initial step signal (not shown) may be produced by a digital generator to approximate a triangle function. The digital output values of the digital generator are used in the digital-to-analog (DAC) converter 892a. The resulting voltage signal may then be filtered by the low-pass filter 892b to remove quantization noise. Alternatively, an analog signal generator can be used to generate an equivalent triangle voltage signal directly. The filtered voltage signal then is an input to a voltage-to-current converter 892c to produce the desired triangle modulated laser bias current 862 in a form for input to the VCSEL diode 893.

As described above, reflections from an input surface or an intervening object can cause SMI in the VCSEL diode 893 that alter an interferometric parameter of the VCSEL diode 893. This alteration in the interferometric parameter may be measured or inferred, either from a parameter of the VCSEL diode 893 itself or from a parameter of an associated photodetector. The changes can be measured to produce a signal 866. In the system 890 shown it will be assumed the signal 866 is measured by a photodetector. For the triangle modulated laser bias current 862, the signal 866 may be a triangle wave of similar period combined with a smaller and higher frequency signal related to the changes in the interferometric parameter.

The signal 866 is first passed into the high-pass filter 895a, which can effectively convert the major ascending and descending ramp components of the signal 866 to DC offsets. As the signal 866 from a photodetector may be a current signal, the transimpedance amplifier 895b can produce a corresponding voltage output for further processing.

The voltage output can then be sampled and quantized by the analog-to-digital conversion (ADC) block 895c. Before immediately applying a digital FFT to the output of the ADC block 895c, it can be helpful to apply equalization in order to clear remaining residue of the triangle signal received by the photodiode, and thus isolate the interferometric signal. The initial digital signal values from the digital generator used to produce the triangle modulated laser bias current 862 are used as input to the digital high pass filter 894a to produce a digital signal to correlate with the output of the ADC block 895c. An adjustable gain can be applied by the digital variable gain block 894b to the output of the digital high pass filter 894a.

The output of the digital variable gain block 894b is used as one input to the digital equalizer and subtractor block 896. The other input to the digital equalizer and subtractor block 896 is the output of the ADC block 895c. The two signals are differenced, and used as part of a feedback to adjust the gain provided by the digital variable gain block 894b.

Once an optimal correlation is obtained by the feedback, an FFT, indicated by block 897, can then be applied to the components of the output of the ADC block 895c corresponding to the rising and descending of the triangle wave. From the FFT spectra obtained, movement of the user input surface can be inferred, as discussed above and indicated by block 898.

The second family of embodiments of methods and devices for recognizing a user input on the input surface directly obtains distance or displacement measurements from the signal of an interferometric parameter using a time domain based analysis. This family is described in relation to FIGS. 9A-C and 10. The methods and devices make use of a sinusoidal modulation of a bias current of the laser diode and detects resulting effects in an interferometric parameter of a photodetector associated with the laser diode.

In this second family of embodiments, a laser light source, such as any of the VCSELs described in FIGS. 3A-D, is used to direct laser light at the input surface, such as the input surface 102 of FIG. 1A. For simplicity of explanation only for this family of embodiments, the laser light source(s) will be assumed to be VCSEL(s). One skilled in the art will recognize how the embodiments may make use of other types of lasers or light sources that undergo self-mixing interference. In this second family of embodiments, there may be one or more photodetectors associated with each VCSEL, at least one of whose output parameters is correlated with a property of the self-mixing of the laser light that arises when some of the laser light emitted from the VCSEL diode is received back into the VCSEL diode after reflection from a target. In some embodiments, the photodetector is integrated as part of the VCSEL, such as in FIG. 3A. In other embodiments, the photodetector may be separate from the VCSEL, as in FIG. 3B. Instead of, or in addition to, an output of such a photodetector, some embodiments may measure another interferometric property of the VCSEL diode, such as a junction voltage.

The self-mixing interference effect contains at least two contributions: a first contribution from internal an electric field existing within the VCSEL diode and a second contribution from reflections from the target coupled back into the VCSEL diode, as indicated in FIG. 4B. The second contribution can enter the laser cavity phase shifted from the first. The radian value of the phase shift can be expressed as $\Delta\varphi = 2\pi[2L \mod \lambda]$, or equivalently as $2\pi(2L/\lambda - \lfloor 2L/\lambda \rfloor)$, where $\lambda$ is the wavelength of the laser light.

The bias current of a VCSEL diode may be driven by electronics, or other means, to include a superimposed sinusoidal modulation component, to have the form $I_{BIAS} \propto 1 + \beta \sin(\omega_m t)$, where $\beta$ is typically less than 1, and $\omega_m$ is the radian modulation frequency. The radian modulation frequency $\omega_m$ is much less than the frequency of the laser light. When a VCSEL diode is driven with such a bias current, the phase of the optical feedback light returning from the target upon reflection is such that $\Delta\varphi \propto a + b \sin(\omega_m t)$, for constants a and b. Certain specific forms for constants a and b for some embodiments will be presented below.

When the two contributions coherently interfere inside the laser cavity, the phase shift between them can cause their electric fields to interfere, either destructively or constructively. As a result, an output current of the photodetector can have the form $I_{PD} \propto [1 + \delta \cos(\Delta\varphi)]$ in response to the similarly evolving optical output power of the VCSEL diode.

The Fourier series expansion of the function $\cos(a + b \sin(\omega_m t))$ has the form $F\{\cos(a + b \sin(\omega_m t))\} = J_0(b)\cos(a) - 2J_1(b)\sin(a)\sin(\omega_m t) + 2J_2(b)\cos(a)\cos(2\omega_m t) - 2J_3(b)\sin(a)\sin(3\omega_m t) +$ higher order harmonics, where $J_k$ indicates the Bessel function of the first kind of order k. So for the situation above of a sinusoidally modulated bias current of a VCSEL, the photodetector output current has a harmonics of the radian modulation frequency that can be selected by filtering, and the respective coefficient values that can be determined by demodulation, as explained in relation to FIGS. 9A-C and 10 below.

For a target that had an initial distance $L_0$ from the VCSEL diode, and which has undergone a displacement of $\Delta L$ from $L_0$, the constants a and b above in some cases are given by:

$$a = [4\pi(L_0 + \Delta L)/\lambda], \text{ and } b = [-4\pi\Delta\lambda(L_0 + \Delta L)/\lambda^2].$$

Certain specific forms of the expansion for $I_{PD}$ may thus be given by:

$I_{PD} \propto$ Baseband Signal $$-2J_1\left[\frac{-4\pi\Delta\lambda L_0}{\lambda^2}\left(1 + \frac{\Delta L}{L_0}\right)\right]\sin\left(\frac{4\pi\Delta L}{\lambda}\right)\sin(\omega_m t)$$

$$+2J_2\left[\frac{-4\pi\Delta\lambda L_0}{\lambda^2}\left(1 + \frac{\Delta L}{L_0}\right)\right]\cos\left(\frac{4\pi\Delta L}{\lambda}\right)\cos(2\omega_m t)$$

$$-2J_3\left[\frac{-4\pi\Delta\lambda L_0}{\lambda^2}\left(1 + \frac{\Delta L}{L_0}\right)\right]\sin\left(\frac{4\pi\Delta L}{\lambda}\right)\sin(3\omega_m t) + \ldots$$

By defining a Q-component of $I_{PD}$ as a low pass filtering and demodulation with respect to the first harmonic, i.e., $Q \propto \text{Lowpass}\{I_{PD} \times \sin(\omega_m t)\}$, and an I-component as a low pass filtering and demodulation with respect to the second harmonic, i.e., $I \propto \text{Lowpass}\{I_{PD} \times \cos(2\omega_m t)\}$, one can obtain a first value $$Q \propto \sin\left(\frac{4\pi\Delta L}{\lambda}\right),$$

and a second value $$I \propto \cos\left(\frac{4\pi\Delta L}{\lambda}\right).$$

Then one can use the unwrapping arctan function (that obtains an angle in any of all four quadrants) to obtain the displacement as $$\Delta L = \frac{\lambda}{4\pi}\arctan(Q/I).$$

In a modification of this implementation of the low pass filtering and demodulation, a Q'-component of $I_{PD}$ can be defined as a low pass filtering and demodulation with respect to the third harmonic, i.e., $Q' \propto \text{Lowpass}\{I_{PD} \times \sin(3\omega_m t)\}$. This can then be used with the I-component derived by filtering and demodulation at the second harmonic, as above, to obtain a modified first value $$Q' \propto \sin\left(\frac{4\pi\Delta L}{\lambda}\right),$$

and the second value $$I \propto \cos\left(\frac{4\pi\Delta L}{\lambda}\right).$$

Then, as before, one can use the unwrapping arctan function (that obtains an angle in any of all four quadrants) to obtain the displacement as $$\Delta L = \frac{\lambda}{4\pi} \arctan(Q'/I).$$

This modification makes use of frequency components of $I_{PD}$ separate from the original modulation frequency $\omega_m$ applied to the VCSEL diode bias current $I_{BIAS}$. This may reduce the need for filtering and/or isolation of $I_{PD}$ at the original modulation frequency $\omega_m$.

In a still further modification, one can use the form of the Baseband Signal (DC signal component) in the expansion above to obtain an alternative I-component derived by filtering and demodulation at the DC component:

$$I' \propto \cos\left(\frac{4\pi \Delta L}{\lambda}\right).$$

This alternative I-component can then be used with the Q-component above to obtain $$\Delta L = \frac{\lambda}{4\pi} \arctan(Q/I').$$

Figure 9A:
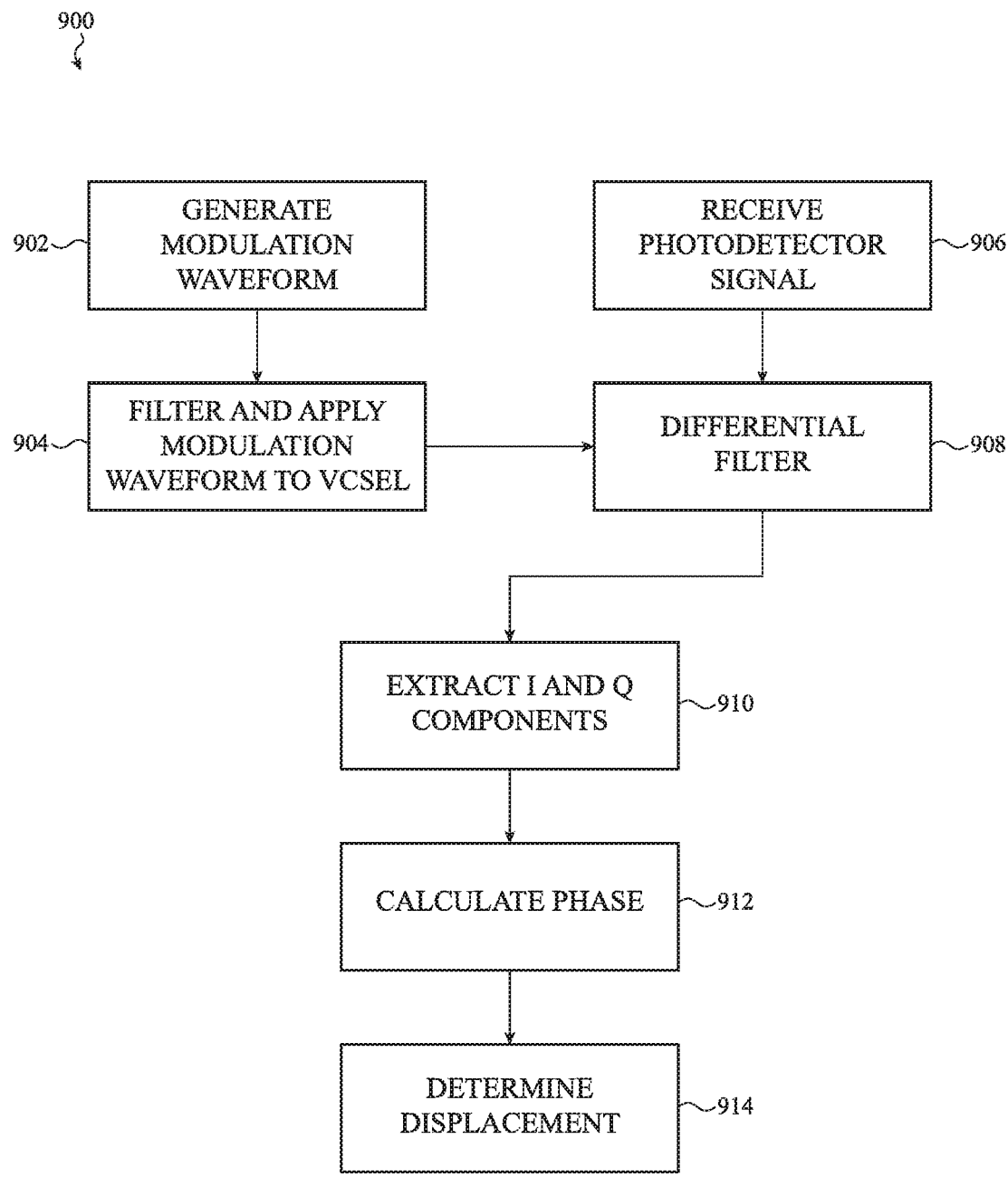
FIG. 9A is a flow chart of a time domain method for determining distances from a light source to an object using self-mixing interferometry, according to an embodiment.

The low pass filtering and demodulations just discussed can be further explained in relation to FIGS. 9A-C and FIG. 10. FIG. 9A is a flow chart of a method 900 for detecting displacement of an input surface, such as any of input surfaces 102, 152, 212, 402 or another such input surface, from an initial distance.

At block 902, the modulation waveform for the bias current to the VCSEL diode is generated. The generation may involve separately generating a direct current (DC) input signal and a sine wave current input signal with desired modulation frequency $\omega_m$ (in radians), and then summing the two signals to produce $I_{BIAS}$. The two input signals can be generated by either current sources, or from voltage sources that produce $I_{BIAS}$. The generation of the two input signals may initially begin using one or more digital generators, such as digital-to-analog (DAC) converters.

At block 904, the generated modulation waveform may be filtered to reduce signal frequency components not at the desired modulation frequency $\omega_m$. Such filtering may be a digital filtering applied to a digital sine wave source, or an analog filtering of an analog sine wave current input signal. Filtering may also be applied to the DC signal source before being summed with the sine wave current input signal.

The generated modulation waveform is applied to $I_{BIAS}$, modifying the VCSEL diode's emitted laser light accordingly. Self-mixing interference then may occur due to reflections of from either an input surface or an object (such as a finger or stylus) in the field of view.

At block 906, a photodetector receives the VCSEL diode's laser light, and a corresponding signal produced. The signal may be a photodetector current, a voltage of the photodetector, or another interferometric property. Further, as explained above, the photodetector may be integrated with the VCSEL diode itself.

Because the bias current of the VCSEL diode was modulated at desired modulation frequency $\omega_m$, it may well be that the received photodetector signal also has a frequency component at $\omega_m$. At block 908, a scaled version of the modulated form of $I_{BIAS}$ and received photodetector signal may be differenced in a differential filtering to reduce cross-talk or other interferences. The result may be a differenced signal that correlates with the self-mixing interference in the VCSEL diode's laser light.

At block 910, an I and a Q component of the filtered form of the photodetector signal are then extracted. These extractions may be performed by separate mixing (multiplying) of the filtered form of the photodetector signal with separately generated sinusoidal signals at respective frequencies $\omega_m$ and $2\omega_m$, as discussed above. Alternatively, the modifications discussed above based on using either Q' or I' may be used. The mixed signals are then separately low pass filtered.

At block 912, the phase of the I and Q components may be calculated using unwrapping arctan function, as described above. An alternative method of obtaining the phase may also be used. At block 914, the displacement is determined based on the phase, as described above.

Figure 9B:
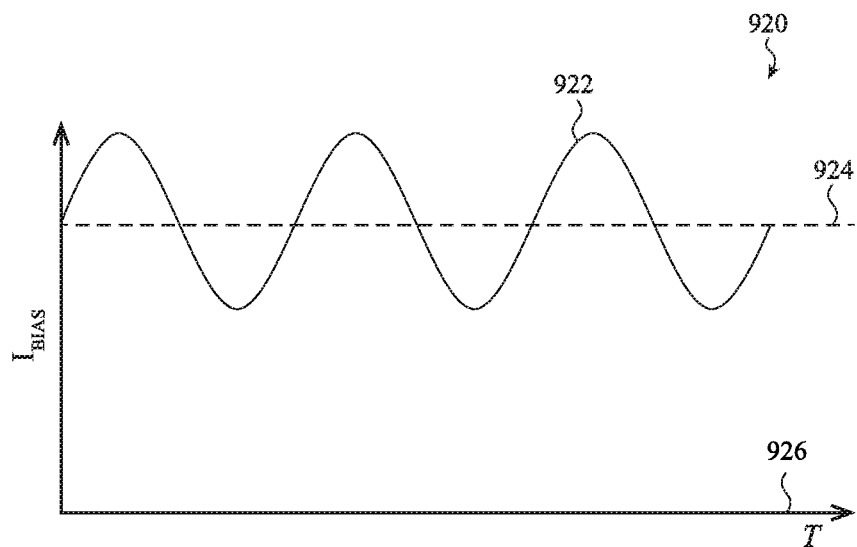
FIGS. 9B-C show time-correlated graphs of signals that may occur in a self-mixing interferometry sensor, according to an embodiment.
Figure 9C:
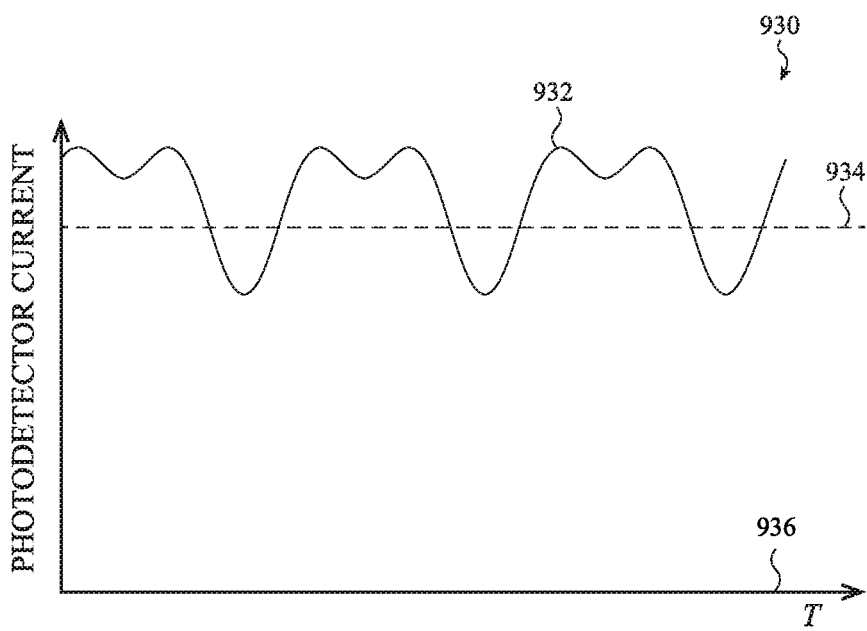

FIGS. 9B-C show two time correlated graphs: 920, 930. Graph 920 shows a plot 922 of a bias current $I_{BIAS}$ of a VCSEL diode modulated by a sine wave at a single frequency. The amplitude of the sinusoidal modulation is only for illustration, and need not correspond to amplitudes used in all embodiments. The bias current $I_{BIAS}$ has its sinusoidal variation about a fixed direct current value, 924.

As a result of the sinusoidal modulation, the output current of a photodetector receiving the VCSEL's self-mixing laser light undergoes a time variation, shown in the plot 932 in the graph 930. The time axes of graphs 926 and 936 are correlated. The plot 932 illustrates that the output current of the photodetector varies around a fixed direct current value 934.

Figure 10:
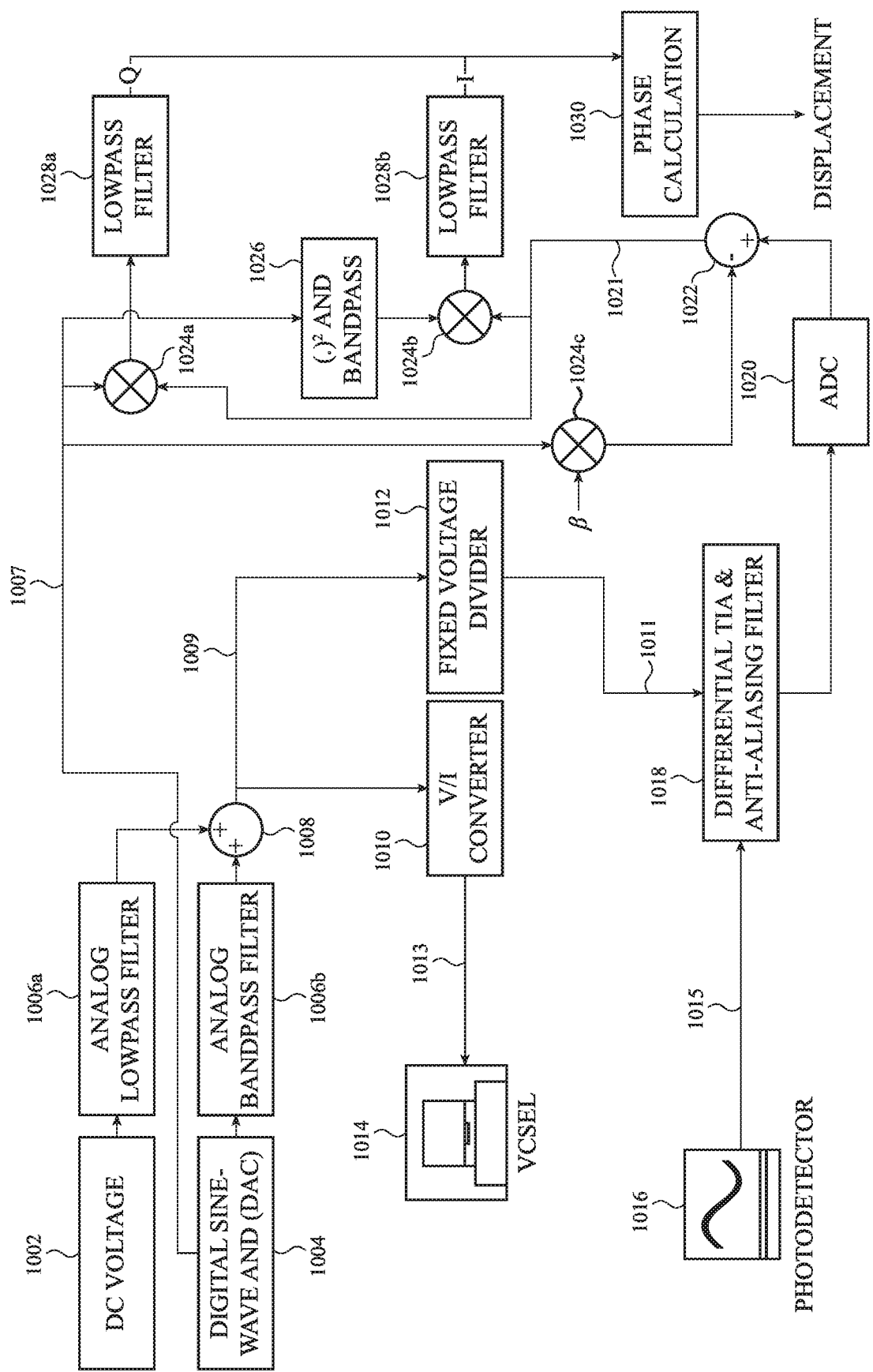
FIG. 10 illustrates a block diagram of a circuit operable to implement the time domain method for determining distances from a light source to an object using self-mixing interferometry, according to an embodiment.

The sinusoidally modulated bias current $I_{BIAS}$ and corresponding photodetector current may arise within the circuit shown in FIG. 10, as now described. Other circuits may be used to implement the time domain I/Q methods as described, and may produce bias currents and respective photodetector currents having respective plots similar to 922 and 932.

FIG. 10 shows an exemplary circuit block diagram that may be used to implement this third family embodiments. Other circuits may also be used, as would be clear to one skilled in the art. The circuit block diagram of FIG. 10 shows the relationship and connections of certain components and sections; other circuits that implement these embodiments may use more or fewer components. As explained in more detail below, FIG. 10 shows components which generate and apply a sinusoidally modulated bias current to a VCSEL. The sinusoidal bias current can generate in a photodetector 1016 an output current depending on the frequency of the sinusoidal bias and the displacement to the target. In the circuit of FIG. 10, the photodetector's 1016 output current is digitally sampled and then multiplied with a first sinusoid at the frequency of the original sinusoidal modulation of the bias current, and a second sinusoid at double that original frequency. The two separate multiplied outputs are then each low pass filtered and the phase calculated. Thereafter the displacement is determined using at least the phase.

The DC voltage generator 1002 is used to generate a constant bias voltage. A sine wave generator 1004 may produce an approximately single frequency sinusoid signal, to be combined with constant voltage. As shown in FIG. 10, the sine wave generator 1004 is a digital generator, though in other implementations it may produce an analog sine wave. The low pass filter 1006A provides filtering of the output of the DC voltage generator 1002 to reduce undesired varying of the constant bias voltage. The bandpass filter 1006B can be used to reduce distortion and noise in the output of the sine wave generator 1004 to reduce noise, quantization or other distortions, or frequency components of its signal away from its intended modulation frequency, $\omega_m$.

The circuit adder 1008 combines the low pass filtered constant bias voltage and the bandpass filtered sine wave to produce on link 1009 a combined voltage signal which, in the embodiment of FIG. 10, has the form $V_0+V_m \sin(\omega_m t)$. This voltage signal is used as an input to the voltage-to-current converter 1010 to produce a current to drive the lasing action of the VCSEL diode 1014. The current from the voltage-to-current converter 1010 on the line 1013 can have the form $I_0+I_m \sin(\omega_m t)$.

The VCSEL diode 1014 is thus driven to emit a laser light modulated as described above. Reflections of the modulated laser light may then be received back within the lasing cavity of VCSEL diode 1014 and cause self-mixing interference. The resulting self-mixing interference light may be detected by photodetector 1016. As described above, in such cases the photocurrent output of the photodetector 1016 on the link 1015 can have the form: $i_{PD}=i_0+i_m \sin(\omega_m t)+\gamma \cos(\varphi_0+\varphi_m \sin(\omega_m t))$. As the I/Q components to be used in subsequent stages are based on just the third term, the first two terms can be removed or reduced by the differential transimpedance amplifier and anti-aliasing (DTIA/AA) filter 1018. To do such a removal/reduction, a proportional or scaled value of the first two terms is produced by the voltage divider 1012. The voltage divider 1012 can use as input the combined voltage signal on the link 1009 produced by the circuit adder 1008. The output of the voltage divider 1012 on link 1011 can then have the form $\alpha(V_0+V_m \sin(\omega_m t))$. The photodetector current and this output of the voltage divider 1012 can be the inputs to the DTIA/AA filter 1018. The output of the DTIA/AA filter 1018 can then be, at least mostly, proportional to the third term of the photodetector current.

The output of the DTIA/AA filter 1018 may then be quantized for subsequent calculation by the analog-to-digital converter (ADC) block 1020. Further, the output of the ADC block 1020 may have a residual signal component proportional to the sine wave originally generated by the sine wave generator 1004. To filter this residual signal component, the originally generated sine wave can be scaled (such as by the indicated factor of β) at multiplier block 1024C, and then subtracted from the output of ADC block 1020. The filtered output on link 1021 may have the form $A+B \sin(\omega_m t)+C \cos(2\omega_m t)+D \sin(3\omega_m t)+ \ldots$, from the Fourier expansion discussed above. The filtered output can then be used for extraction of the I/Q components by mixing.

The digital sine wave originally generated by sine wave generator 1004 onto link 1007 is mixed (multiplied) by the multiplier block 1024A with the filtered output on link 1007. This product is then low pass filtered at block 1028a to obtain the Q component discussed above.

Also, the originally generated digital sine wave is used as input into the squaring/filtering block 1026 to produce a digital cosine wave at a frequency double that of the originally produced digital sine wave. The digital cosine wave is then mixed (multiplied) at the multiplier component 1024b with the filtered output of the ADC block 1020 on link 1021. This product is then low pass filtered at component 1028b to obtain the I component discussed above.

The Q and the I components are then used by the phase calculation component 1030 to obtain the phase, from which the displacement of the target can be calculated, as discussed above.

One skilled in the art will appreciate that while the embodiment shown in FIG. 10 makes use of the digital form of the originally generated sine wave produced by sine wave generator 1004 onto link 1007, in other embodiments the originally generated sine wave may be an analog signal and mixed with an analog output of the DTIA/AA 1018.

The circuit of FIG. 10 can be adapted to implement the modified I/Q method described above that uses $Q' \propto \text{Lowpass}\{I_{PD} \times \sin(3\omega_m t)\}$. Some such circuit adaptations can include directly generating both mixing signals $\sin(2\omega_m t)$ and $\sin(3\omega_m t)$, and multiplying each with the output of the ADC block 1020, and then applying respective low pass filtering, such as by the blocks 1028a,b. The differential TIA and anti-aliasing filter may then be replaced by a filter to remove or greatly reduce the entire component of $I_{PD}$ at the original modulation frequency $\omega_m$. One skilled in the art will recognize other circuit adaptations for implementing this modified I/Q method.

In additional and/or alternative embodiments, any of the I/Q time domain based methods just described may be used with the spectrum based methods of the first family of embodiments. The spectrum methods of the first family can be used at certain times to determine the absolute distance to the input surface or intervening object, and provide a value of $L_0$. Thereafter, during subsequent time intervals, any of the various I/Q methods just described may be used to determine $\Delta L$.

In additional and/or alternative embodiments, the spectrum methods based on triangle wave modulation of a bias current of a VCSEL may be used as a guide for the I/Q time domain methods. The I/Q methods operate optimally in the case that $J_1(b)=J_2(b)$, so that the I and Q components have the same amplitude. However, b depends on the distance L. An embodiment may apply a triangle wave modulation to the VCSEL's bias current to determine a distance to a point of interest. Then this distance is used find the optimal peak-to-peak sinusoidal modulation of the bias current to use in an I/Q approach. Such a dual method approach may provide improved signal-to-noise ratio and displacement accuracy obtained from the I/Q method.

In further additional and/or alternative embodiments, the speed of the scanning operations may be varied according to a detected presence or absence of an intervening object. For example, if a scan of the field of view shows an absence of a user's finger or stylus, and only indicates that the input surface is positioned as previously determined, the electronic device or system may lengthen a time interval between initiation of the next scan of the field of view. If a scan of a field of view does indicate the presence of an intervening object, the electronic device or system may reduce the time interval between subsequent scans to better capture motion or gesture of the object in the field of view. Similarly, a number of locations within a scan of a row at which distances are measured may be varied depending on the detected presence or absence of an intervening object. Increasing such a number may improve the resolution and accuracy of measurement of the topography of the intervening object (e.g., the user's finger).

Figure 11:
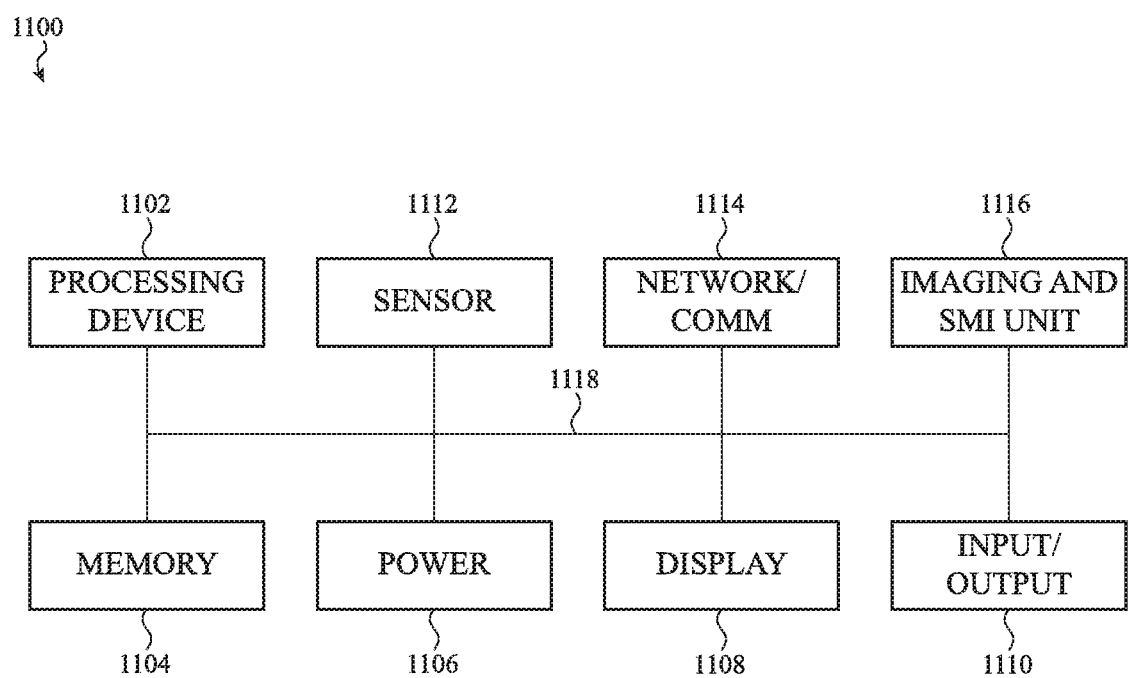
FIG. 11 illustrates a block diagram of an electronic device configured to detect user input, according to an embodiment.

Referring now to FIG. 11, there is shown an exemplary structural block diagram of components of an electronic device 1100, such as the embodiments described above. The block diagram is exemplary only; various embodiments described above may be implemented using other structural components and configurations. The electronic device 1100 can include one or more processors or processing unit(s) 1102, storage or memory components 1104, a power source 1106, a display 1108 (which may display operating status, display the image being projected onto the surface, etc.), input/output interface 1110, one or more sensors 1112, a network communication interface 1114, and one or more imaging and SMI units 1116, which may include image projectors, self-mixing interferometry sensors, and cameras, as described above. Either of the display 1108 or the input/output interface 1110 may include input touch screen by which a user can control operation of the electronic device 1100. These various components will now be discussed in turn below.

The one or more processors or processing units 1102 can control some or all of the operations of the electronic device 1100. The processor(s) 1102 can communicate, either directly or indirectly, with substantially all of the components of the electronic device 1100. In various embodiments, the processing units 1102 may receive the self-mixing interferometry signals from the imaging and SMI units 1116, such as self-mixing interferometry signals from any or all of the photodetectors, VCSELs, and other electronics of the imaging and SMI units 1116. Such signals may include those that correspond to the interferometric parameters, and perform any of the methods, or parts of the methods, discussed above.

For example, one or more system buses 1118 or other communication mechanisms can provide communication between the processor(s) or processing units 1102, the storage or memory components 1104 (or just "memory"), the power source 1106, the display 1108, the input/output interface 1110, the sensor(s) 1112, the network communication interface 1114, and the one or more imaging and SMI units 1116. The processor(s) or processing units 1102 can be implemented as any electronic device capable of processing, receiving, or transmitting data or instructions. For example, the one or more processors or processing units 1102 can be a microprocessor, a central processing unit (CPU), an application-specific integrated circuit (ASIC), a digital signal processor (DSP), or combinations of multiple such devices. As described herein, the term "processor" or "processing unit" is meant to encompass a single processor or processing unit, multiple processors, multiple processing units, or other suitably configured computing element or elements.

The memory 1104 can store electronic data that can be used by the electronic device 1100. For example, the memory 1104 can store electrical data or content such as, for example, audio files, document files, timing signals, algorithms, and image data. The memory 1104 can be configured as any type of memory. By way of example only, memory 1104 can be implemented as random access memory, read-only memory, Flash memory, removable memory, or other types of storage elements, in any combination.

The power source 1106 can be implemented with any device capable of providing energy to the electronic device 1100. For example, the power source 1106 can be a battery or a connection cable that connects the electronic device 1100 to another power source such as a wall outlet.

The display 1108 may provide an image or video output for the electronic device 1100. The display 1108 can be substantially any size and may be positioned substantially anywhere on the electronic device 1100. In some embodiments, the display 1108 can be a liquid display screen, a plasma screen, or a light emitting diode screen. The display 1108 may also function as a user input surface, in addition to displaying output from the electronic device 1100. In these embodiments, a user may press on the display 1108 in order to provide input to the electronic device 1100. The display 1108 may provide a means by which a user can, for example, adjust focus, control color, zoom, or control other operations of the imaging and SMI units 1116.

The input/output interface 1110 can receive data or inputs from a user or one or more other electronic devices. The I/O interface 1110 can include a display, a touch input surface such as described in the embodiments above, a track pad, one or more buttons, one or more microphones or speakers, one or more ports such as a microphone port, and/or a keyboard.

In addition to photodetectors and monitors of VCSEL diode properties, the one or more sensors 1112 may include other types of sensors. Examples of sensors include, but are not limited to, heat sensors, light sensors such as light emitting sensors and/or light detection sensors, audio sensors (e.g., microphones), gyroscopes, and accelerometers. Example light emitting sensors include, but are not limited to, the VCSELs described above. Other example light detection sensors include, but are not limited to, sensors that include optical or photodetectors such as photodiodes and photoresistors. The sensor(s) 1112 can be used to provide data to the processor 1102, which may be used to enhance or vary functions of the electronic device.

The network communication interface 1114 can facilitate transmission of data to a user or to other electronic devices. For example, the network communication interface 1114 can receive data from a network or send and transmit electronic signals via a wireless or wired connection. Examples of wireless and wired connections include, but are not limited to, cellular, WiFi, Bluetooth, and Ethernet. In one or more embodiments, the network communication interface 1114 supports multiple network or communication mechanisms. For example, the network communication interface 1114 can pair with another device over a Bluetooth network to transfer signals to the other device while simultaneously receiving signals from a WiFi or other wired or wireless connection.

The one or more imaging and SMI units 1116 can be as in any of the embodiments described above. Various elements of the imaging and SMI units 1116, such as the image projection system and/or the SMI sensor, can be controlled by timing signals or other signals supplied from the processor 1102 and/or the memory 1104.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method of operating an electronic device, comprising:
   scanning a field of view with a beam of light emitted by a self-mixing interferometry sensor;
   identifying, using a self-mixing interferometry signal generated by the self-mixing interferometry sensor, an input surface in the field of view and an object in the field of view;
   detecting a first distance between the input surface and the self-mixing interferometry sensor;
   detecting a second distance between the object and the self-mixing interferometry sensor, the second distance shorter than the first distance;
   detecting a third distance between the object and the self-mixing interferometry sensor, the third distance longer than the second distance and corresponding to an interaction between the object and the input surface; and
   identifying a user input to the electronic device by comparing the second distance and the third distance.

2. The method of claim 1, further comprising:
   determining, from the self-mixing interferometry signal and a scan pattern, a location of the interaction between the object and the input surface;
   mapping the location of the interaction to a portion of an image projected onto the input surface; and
   altering an operation of the electronic device based on the user input; wherein altering the operation of the electronic device comprises at least one of:
      changing the image;
      executing an action of the electronic device associated with the portion of the image; or
      providing a feedback to a user of the electronic device.

3. The method of claim 2, wherein mapping the location of the interaction includes:
   determining at least one of a topography or an orientation of the input surface; and
   determining a correspondence between points of the image projected onto the input surface and the topography or the orientation of the input surface.

4. The method of claim 1, wherein:
   the beam of light is produced by a laser diode;
   the self-mixing interferometry signal is an output of a photodetector associated with the laser diode;
   identifying the input surface and the object is based at least on:
      a first set of distances from the input surface to the laser diode determined using at least the self-mixing interferometry signal; and
      a second set of distances from the object to the laser diode determined using at least the self-mixing interferometry signal;
   the first distance corresponds to the first set of distances; and
   the second distance and the third distance correspond to the second set of distances.

5. The method of claim 1, further comprising determining that the object is a finger of a user; wherein a difference between the second distance and the third distance corresponds to a deformation of the finger caused by the finger applying a force against the input surface.

6. The method of claim 5, further comprising:
   determining a magnitude of the force applied by the finger based on the deformation;
   determining that the user input is a first user input when the magnitude exceeds a first threshold but is less than a second threshold; and
   determining that the user input is a second user input when the magnitude exceeds the second threshold.

7. The method of claim 5, further comprising determining that the finger ceases applying the force against the input surface based on a reduction of the deformation.

8. The method of claim 1, further comprising:
   determining that the object is a finger of a user; wherein detecting the deformation of the finger includes:
      determining a height of the finger above the input surface; and
      comparing the height of the finger above the input surface to a finger thickness.

9. The method of claim 1, further comprising:
   determining a motion of the object within the field of view; and
   identifying the user input based at least on the motion.

10. An electronic device, comprising:
    a self-mixing interferometry sensor operable to scan a field of view with a beam of light, the field of view including an input surface; and
    a processor operably linked with the self-mixing interferometry sensor and operable to:
       determine first distances from the self-mixing interferometry sensor to the input surface using a self-mixing interferometry signal generated by the self-mixing interferometry sensor;
       determine, at a first time, second distances from the self-mixing interferometry sensor to an object in the field of view using the self-mixing interferometry signal generated by the self-mixing interferometry sensor;
       determine, at a second time after the first time, third distances from the self-mixing interferometry sensor to the object using the self-mixing interferometry signal generated by the self-mixing interferometry sensor;
       identify a deformation of the object due to an interaction of the object with the input surface using at least the first distances, the second distances, and the third distances; and
       identify a user input to the electronic device from the identified deformation.

11. The electronic device of claim 10, further comprising:
    an image projector operable to project an image onto the input surface in the field of view; wherein:
       the processor is further operable to:
          determine, from the self-mixing interferometry signal and a scan pattern of the field of view, a position of the interaction of the object with the input surface;
          map the position of the interaction to a portion of the image projected onto the input surface by the image projector; and
          alter an operation of the electronic device based on the user input; and
       altering the operation of the electronic device comprises at least one of:
          changing the image;
          executing an action of the electronic device associated with the portion of the image; or
          providing feedback to a user of the electronic device.

12. The electronic device of claim 10, wherein:
    the beam of light is a laser light emitted from a laser diode; and the self-mixing interferometry signal is an output of a photodetector associated with the laser diode.

13. The electronic device of claim 12, wherein the laser diode emits infrared electromagnetic radiation.

14. The electronic device of claim 12, wherein the processor is operable to cause a modulation of a bias current to the laser diode, the modulation causing a change in the self-mixing interferometry signal.

15. The electronic device of claim 14, wherein:
the modulation of the bias current of the laser diode is a triangle wave modulation; and
the processor is operable to determine each of the first distances from the self-mixing interferometry sensor to first locations on the input surface and the second distances or the third distances from the self-mixing interferometry sensor to second locations or third locations on the object using a spectrum analysis of the self-mixing interferometry signal.

16. The electronic device of claim 14, wherein:
the modulation of the bias current of the laser diode is a sinusoidal wave modulation; and
the processor is operable to determine each of the first distances from the self-mixing interferometry sensor to first locations on the input surface and the second distances or the third distances from the self-mixing interferometry sensor to second locations or third locations on the object using an I/Q analysis of the self-mixing interferometry signal.

17. The method of claim 10, wherein the first time occurs during a calibration procedure, the calibration procedure comprising:
generating a baseline topographical map of the object with respect to the input surface;
storing the baseline topographical map with a memory of the electronic device; and
comparing the baseline topographical map with subsequent objects positioned proximate to the input surface as detected by the self-mixing interferometry sensor to identify subsequent user inputs.

18. A method of operating an electronic device, comprising:
performing a first set of scans of a field of view with a beam of light emitted from a self-mixing interferometry sensor of the electronic device;
determining, from a self-mixing interferometry signal generated by the self-mixing interferometry sensor during the first set of scans, a topography of an input surface within the field of view;
projecting an image from an image projector of the electronic device onto the input surface;
performing a second set of scans of the field of view;
detecting, from the self-mixing interferometry signal measured by the self-mixing interferometry sensor during the second set of scans, an object in the field of view and a three-dimensional position of the object in the field of view;
modulating a bias current of the self-mixing interferometry sensor, the modulation causing a change in the self-mixing interferometry signal;
detecting a deformation of the object as the object interacts with the input surface from the self-mixing interferometry signal; and
determining a user input to the electronic device based on the deformation of the object in the field of view.

19. The method of claim 18, further comprising:
determining a three-dimensional motion of the object in the field of view; and
determining the user input to the electronic device based on the three-dimensional motion of the object in the field of view.

20. The method of claim 19, wherein:
the object is a first object in the field of view; and
the method further comprises:
detecting, from the self-mixing interferometry signal generated by the self-mixing interferometry sensor during the second set of scans, a second object in the field of view;
determining a three-dimensional motion of the second object in the field of view; and
determining the user input to the electronic device based on the three-dimensional motion of the first object and the three-dimensional motion of the second object.

* * * * *

UNITED STATES PATENT AND TRADEMARK OFFICE
CERTIFICATE OF CORRECTION

PATENT NO. : 10,871,820 B2
APPLICATION NO. : 16/408295
DATED : December 22, 2020
INVENTOR(S) : Mehmet Mutlu et al.

Page 1 of 1

It is certified that error appears in the above-identified patent and that said Letters Patent is hereby corrected as shown below:

In the Claims

Column 31, Line 32; Claim 17: "The method of claim 10, wherein the first time occurs" should read as --The electronic device of claim 10, wherein the first time occurs--

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*